INVENTOR
Peter W. Beresin
BY
Millman and Jacobs
ATTORNEYS

June 4, 1968 P. W. BERESIN 3,387,086

MULTIPLEXING SYSTEM FOR SYNCHRONOUS TRANSMISSION OF START-STOP SIGNALS AFTER REMOVAL OF THE START AND STOP BITS

Filed June 29, 1964 9 Sheets-Sheet 2

INVENTOR.
Peter W. Beresin
BY
Millman and Jacobs
ATTORNEYS

INVENTOR.
Peter W. Beresin
BY
Millman and Jacobs
ATTORNEYS

MULTIPLEXING SYSTEM FOR SYNCHRONOUS TRANSMISSION OF START-STOP SIGNALS AFTER REMOVAL OF THE START AND STOP BITS

Filed June 29, 1964 9 Sheets-Sheet 4

INVENTOR.
Peter W. Beresin
BY
Millman and Jacobs
ATTORNEYS

INVENTOR.
PETER W. BERESIN
BY
Millman and Jacobs
ATTORNEYS

June 4, 1968 P. W. BERESIN 3,387,086

MULTIPLEXING SYSTEM FOR SYNCHRONOUS TRANSMISSION OF START-STOP SIGNALS AFTER REMOVAL OF THE START AND STOP BITS

Filed June 29, 1964 9 Sheets-Sheet 6

INVENTOR.
PETER W. BERESIN
BY
Millman and Jacobs
ATTORNEYS

INVENTOR.
PETER W. BERESIN
BY
Millman and Jacobs
ATTORNEYS

INVENTOR.
PETER W. BERESIN
BY
Millman and Jacobs
ATTORNEYS

INVENTOR.
PETER W. BERESIN
BY
Millman and Jacobs
ATTORNEYS

United States Patent Office 3,387,086
Patented June 4, 1968

3,387,086

MULTIPLEXING SYSTEM FOR SYNCHRONOUS TRANSMISSION OF START-STOP SIGNALS AFTER REMOVAL OF THE START AND STOP BITS

Peter W. Beresin, Philadelphia, Pa., assignor to Ultronic Systems Corporation, a corporation of Delaware Filed June 29, 1964, Ser. No. 379,071
9 Claims. (Cl. 178—50)

ABSTRACT OF THE DISCLOSURE

This system multiplexes a plurality of low-speed digital data sources and a high-speed digital data source on a common high-speed transmission line. Each multiplex message has a predetermined synchronizing bit pattern and a plurality of information cells. A cyclic distributor allocates predetermined cells to respective low-speed sources and a predetermined plurality of cells to the high-speed source. At the receiver, a generator produces clock pulses at bit rate and is synchronized by received messages. Upon recognition of the sync pattern, a counter counts clock pulses in groups corresponding to the number of bit intervals in a cell, and produces distribution signals which supply data in the proper cells to low-speed and high-speed output message channels. Cell parity is employed which clearly distinguishes data cells from a cell of the sync pattern. Odd and even messages with differing sync patterns may be employed for respective groups of low-speed sources, with both type messages used for the high-speed source.

This invention relates to communication systems and particularly to a multiplex system.

The present invention has as one of its applications the transmission of digital data signals such as those commonly supplied by relatively slow transmission facilities (e.g. teletype and telegraph lines and slow voice grade or telephone lines) over facilities providing for higher transmission rates (e.g. higher rate voice grade or telephone facilities). Moreover, this invention is concerned with providing an efficient system for multiplex transmission at an optimum rate and at high reliability.

In multiplex communication systems it is not uncommon for spurious transients to appear on the line which tend to garble the information as well as destroy the synchronized operation of the demultiplexing unit at the receiver with the multiplexing unit at the transmitter. When the synchronization is impaired, information may be sent out on an incorrect output channel. In such a system, it has also been found desirable to multiplex sources of information having different types of information units as well as different rates of information transmission.

Accordingly, it is among the objects of this invention to provide a new and improved time division multiplex system.

Another object is to provide a new and improved time division multiplex system for the transmission of data at optimum rates.

Another object is to provide a new and improved time division multiplex system for signal sources having different types of information units and/or different rates of information transmission.

Another object is to provide a new and improved time division multiplex system having high reliability for maintaining the synchronization of the demultiplexer with the multiplexer.

In accordance with an embodiment of this invention, a time division multiplex system is provided in which a message or a word is generated from the information units coming from a plurality of sources. This message incorporates a plurality of information units coming from the signal sources together with a unique pattern of coded signals that ensure synchronization of the demultiplexer with the multiplexer. Optimum information transmission is achieved by removing individual signal elements from the information units that are normally provided by the sources to synchronize these units; i.e. the normally used start and stop bits of each character of information. Thereby, a more effective synchronization is provided by the unique signal pattern in each message, a higher reliability is provided, and a more efficient signal transmission is provided.

Also in accordance with an embodiment of this invention, a system is provided for subdividing each multiplex cycle into a plurality of sub-cycles and for transmitting signals from different pluralities of sources during each of the sub-cycles by means of separately synchronized messages. Thereby, a higher level of reliability is provided in that if one of the sub-cycles is lost due to a spurious condition on the line, the other sub-cycle independently can reestablish synchronization so that the information is transmitted to the correct utilization devices. Moreover, by subdividing the multiplex cycle, it becomes possible to multiplex signal sources having different information rates as well as different sizes of information units.

The foregoing and other objects of this invention, the features thereof as well as the invention itself, may be more fully understood from the following description when read together in connection with the accompanying drawing, in which.

In the drawing, similar parts are referenced throughout by corresponding reference characters.

Figure 1:
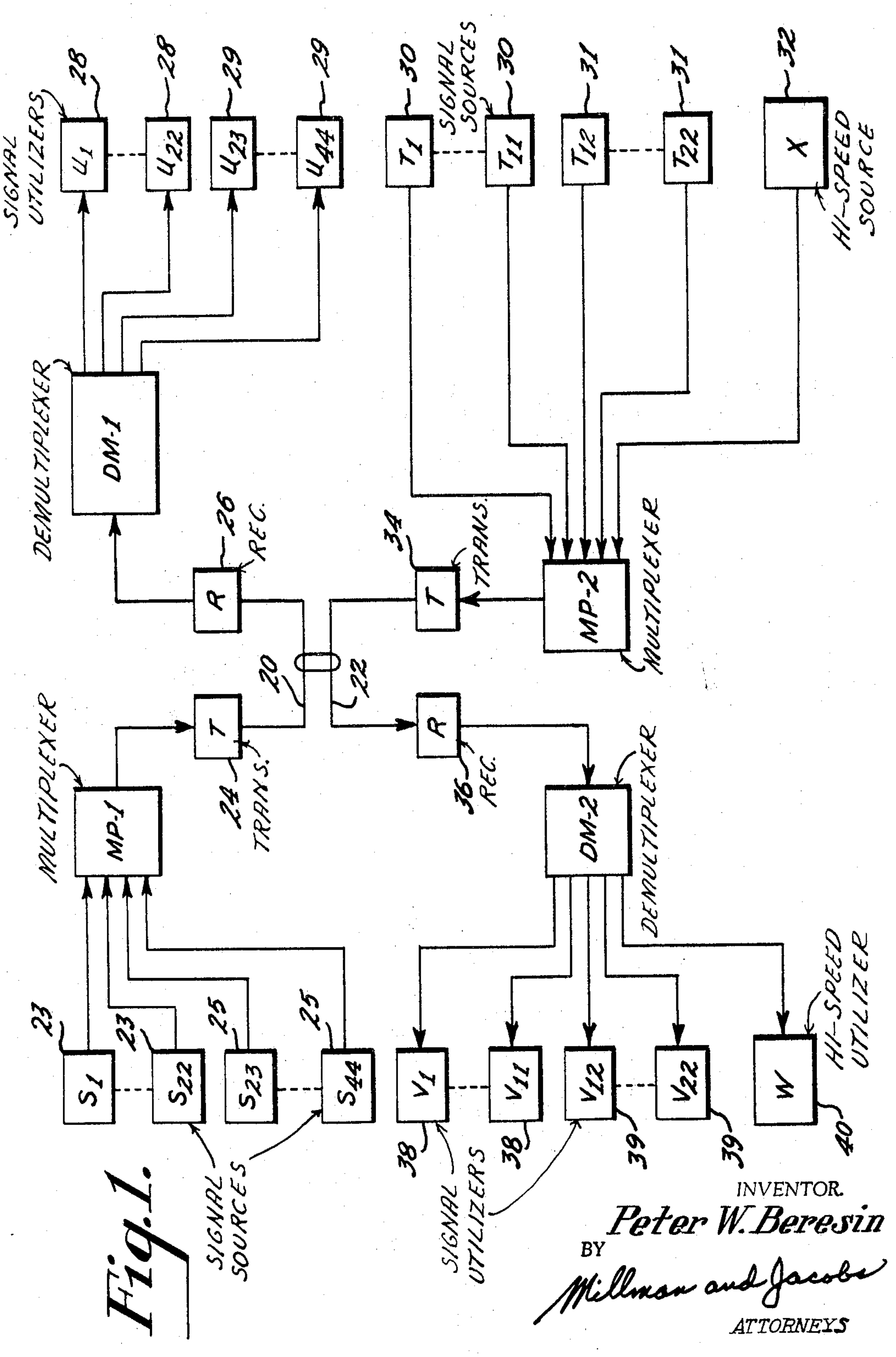
FIG. 1 is a schematic block diagram of a multiplexing system used for two-way data transmission.

In FIG. 1, a two-way communication system is shown that utilizes cable lines 20 and 22; this invention may also be applied to radio communication systems. A plurality of signal sources 23, 25 (e.g. Teletype lines) supply digital signals at a relatively slow rate; the sources are in a plurality of groups (e.g. S–1 to S–22 and S–23 to S–44). The sources supply their signals to a first multiplexer MP–1 which assembles a message containing individual information units from the successive sources of the first group, and a separate message for the second group; thereafter, messages continue to be assembled alternately from the two groups. MP–1 supplies the messages successively to a transmitter 24 that transmits them in appropriate form, such as by a modulation system, over a higher rate cable 20 to a receiver 26 that demodulates the signals and supplies them in appropriate form to a demultiplexer DM–1. DM–1 supplies the information units of the successive messages to utilization devices U–1 to U–22 and U–23 to U–44 in a sequence corresponding to that originating from the sources 23 and 25. The utilization devices (e.g. Teletype lines similar to the sources) are also arranged in a plurality of groups.

For two-way communication, the station having the demultiplexer DM–1 also has a multiplexer MP–2 that receives signals from sources 30, 31 of digital data, identified as T–1 to T–11 and T–12 to T–22, formed in two groups as shown, as well as from a source 32 which supplies information at a different rate and in different types of units. For example, the sources 30, 31 may be signals originating on slow speed teletype lines in standard format for those lines, while the signals from source 32 may be on a voice-grade communication line of substantially higher speed and supplying the information in different types of information units and at different repetition rates.

MP–2 multiplexes the signals from the source 32 alternately with the signals from the sources T–1 to T–11 and the sources T–12 to T–22 and supplies them to the transmitter 34, whence they are transmitted via cable 22 to a receiver 36 associated with the station having the first multiplexer. This station has a demultiplexer DM–2 for demultiplexing the signals received via receiver 36 to utilization devices 38, 39 which are arranged in two groups similar to the sources 30, 31, namely, V–1 to V–11 and V–12 to V–22. A high speed utilization device 40 corresponding to the source 32 receives the associated signals in corresponding time relationships.

Figure 2:
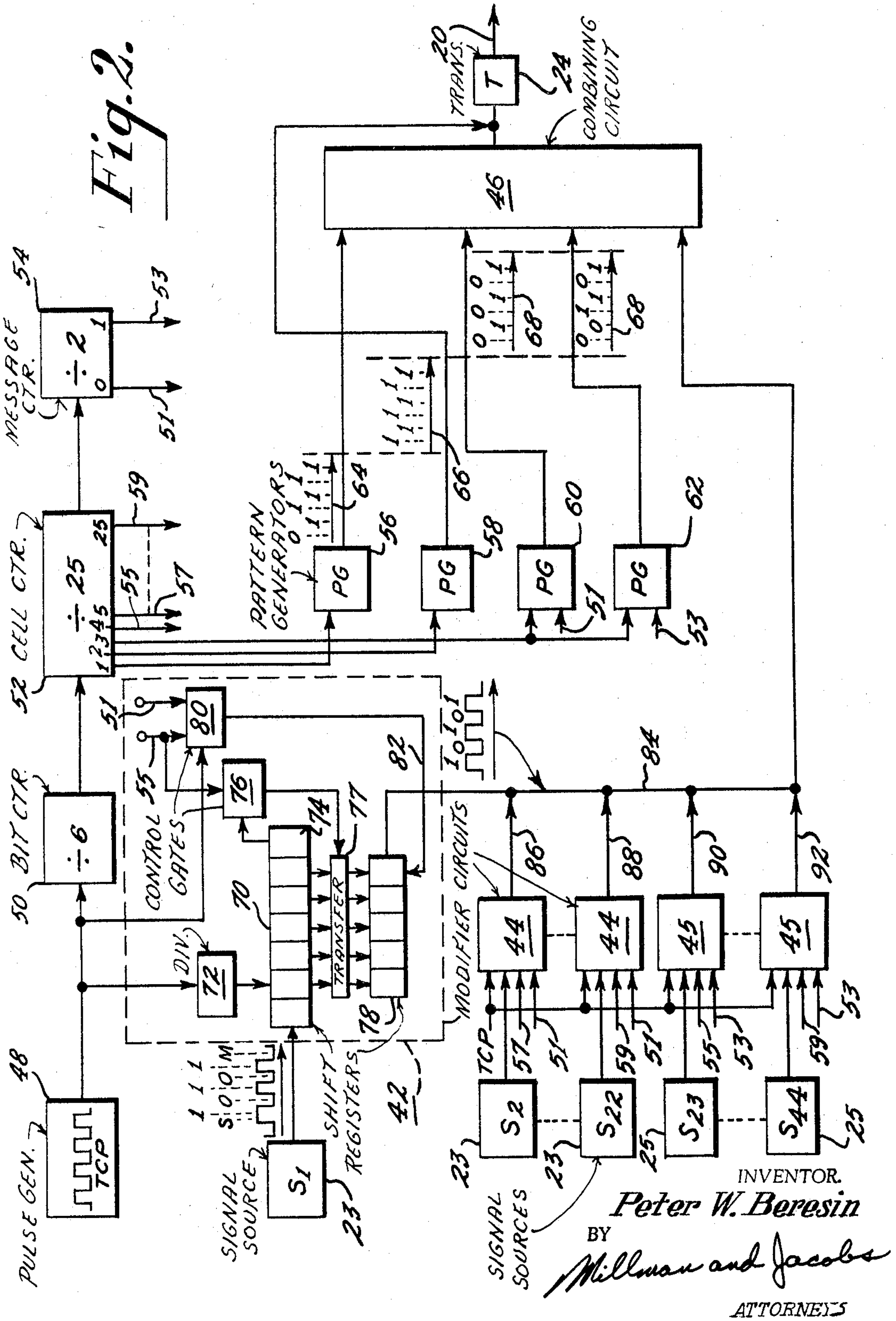
FIG. 2 is a schematic block diagram of one form of multiplexer used in the system of FIG. 1.

A schematic block diagram of the first multiplexer MP–1 is shown in FIG. 2. The sources 23, 25 for purposes of illustration may be considered to be Teletype or telegraph lines that supply coded signal combinations or characters, each of which has five information bits together with start and stop bits, S and M. Thus, by way of example, associated with the output line of S–1 in FIG. 2 is the individual character represented by the signals S10101M, in which a 1-bit (and a start bit) is represented by a "space" signal, and a 0-bit (and a stop bit) is represented by a "mark" signal in accordance with a common convention. Customarily, each space and data bit signal is a level 20 milliseconds (ms.) in duration, and the mark bit is at least 30 ms. in duration.

The signals and characters from the other sources 23, 25 are all assumed to be of the same type. The signals from the source S–1 are supplied to a modifier circuit 42 as shown in a broken line block; and the signals from the other sources S–2 to S–44 are supplied to similar circuits 44, 45. The modified characters from the circuits 42, 44, and 45 are supplied in sequence to a combining circuit 46, which also receives other sequences of signal combinations, and which also performs the function of generating a parity check signal; that is, a signal for checking errors in transmission. The outputs of the combining circuit 46 are supplied to the transmitter 20, which may be any of various types of modulating circuits appropriate for the communications channel 20.

A freely running pulse generator 48 supplies clock pulses TCP at a pulse repetition rate corresponding to the information bit transmission rate of the transmitter 24. A bit position counter 50 divides the pulse repetition rate from the source 48 by a factor of six to produce an output pulse corresponding to each cell of information made up of six bits, each of which is defined by a TCP. These cell defining pulses are supplied to a cell counter 52, which divides by 25 to provide an output pulse upon the completion of each 25 cells that are counted. The pulse from counter 52 defines a message, and it is used to trigger a single stage binary counter 54 that alternates between two states upon receiving successive trigger pulses, and that has two output lines 51 and 53 that respectively represent odd and even-numbered messages. The counter 52 also supplies individual signals on 25 lines corresponding to each of the 25 cells that it counts.

Four signal generators 56, 58, 60, and 62 are used to generate individual patterns of signal combinations, each pattern being a cell of six signal bits. A line corresponding to a count of 1 in counter 52 is connected to pattern generator 56 to initiate the generation of its pattern; a line corresponding to the count of 2 from counter 52 is supplied to pattern generator 58; and a line corresponding to a count of 3 is supplied to both pattern generators 60 and 62. The latter pattern generators also receive the opposite outputs of the flip-flop 54, respectively.

In operation, when the cell counter 52 has a count of 1, the pattern generator 56 generates a pattern of six bits, 011111, during a first cell time represented by the arrow 64. Thereafter, the count-of-2 line in the cell counter 52 enables pattern generator 58 to generate a pattern of six 1-bits over the second cell time period represented by the arrow 66. Thereafter, and assuming that this is a first or odd-numbered cycle of counter 52, pattern generator 60 is enabled by the output line 51 from counter 54 and the count-of-3 line from counter 52. At that time, generator 60 generates a bit combination 010101 during the third cell time represented by the arrow 68.

During some prior time period, a character from source S–1 is supplied serially to and established in a 7-stage serial shift register 70; the latter is shifted under the control of pulses from a pulse generator 72 at a rate corresponding to the transmission rate of S–1 (generator 72 may be an appropriate form of frequency divider for obtaining a slow rate of clock pulses from TCP). When the character is established in register 70, the last stage 74 thereof contains the start (space) signal which is recognized by a gate circuit 76 and which also recognizes the condition that counter 52 is not in a count of 4. Under these conditions, gate 76 supplies a gating pulse to five transfer gates 77 that transfer in parallel the five information bits from the intermediate stages of shift register 70 to the corresponding stages of a 5-stage shift register 78.

Thereafter, when counter 52 does register a count of 4, for this odd-numbered message represented by line 51, a gate 80 (enabled by lines 55 and 51) passes TCP pulses from generator 48 at the desired transmission rate via line 82 to serially shift the register 78 and supply the information character of five bits via line 84 to the combining circuit 46. The latter completes the 6-bit cell by adding an appropriate parity bit; that is, it adds a 1-bit or 0-bit as the sixth bit so that the total number of 1-bits in the cell is an odd number. Accordingly, every cell must contain one or more 0-bits, except the second cell, which has six 1-bits. Thereby, except for a spurious transmission, the eleven successive 1-bits in the first two cells are a unique combination and clearly identify the beginning of each message.

The fourth cell thus completed by the addition of the parity bit is supplied in proper time relationship to the transmitter 24 for transmission on the channel 20. Cell counter 52 then steps to a count of 5, and the circuit 44 operates in a similar fashion to remove the start and stop bits of the characters supplied by the source S–2, and supplies the remaining five bits via line 86 to the combining circuit 46 where the next six-bit cell is developed and sent out in proper sequence. This operation is repeated for each successive cell count, with the characters supplied by each of the sources 23 up to S–22 being handled in its corresponding circuit 44 to remove the start and stop bits and supply the five-bit information character via line 88 to the combining circuit 46 where the same operations are performed. Thereby, a first (or odd-numbered) 25-cell message is developed and transmitted over the channel 20 which effectively multiplexes the individual characters supplied by the first 22 sources.

Upon completion of the first message, message counter 54 is triggered to the opposite state to control via line 53 the generation of a second message. At the same time, cell counter 52 recycles to a count of 1, which is effective to actuate pattern generator 56 to generate its signal pattern in the first cell time 64 of the second message. A count of 2 actuates pattern generator 58 to generate its six 1-bit pattern during the second cell time 66; and during the count of 3, the pattern generator 62 is actuated by line 53 to generate a different pattern of six bits, 001101, during the third cell time 68.

Thereafter, upon the count of 4 in counter 52, the character from S–23 is already established in the associated circuit 45. The latter, being enabled by the signals on lines 55 and 53, supplies its five information bits via line 90 to the combining circuit 46, where a parity bit is added to complete the fourth cell of the second message. This operation continues in the manner described above for successive sources until the five bits of the character supplied by S–44 are sent via the associated circuit 45 (enabled by lines 59 and 53) and via line 92 to the combining circuit 46, where it is completed as the 25th cell of the second message.

Thereafter, the cell counter 52 recycles again to a count of 1, and message counter 54 is triggered back to its initial state, and the complete cycle of operation described above is repeated, first for a sub-cycle of an odd-numbered message, followed by a sub-cycle of an even-numbered message. However, this time the second characters supplied by sources S–1 to S–44 are transmitted successively in the manner described above. It should be noted that the transmission of the entire message (i.e. two complete cycles of counter 52) was completed in a time less than the 150 millisecond length of the Teletype character. Thus, forty-four Teletype characters are transmitted over cable 20 in a shorter period than the character repetition rate of the digital data sources 23, 25. Thus, the multiplexer processes the input data at a faster rate than the data is supplied.

Figure 3:
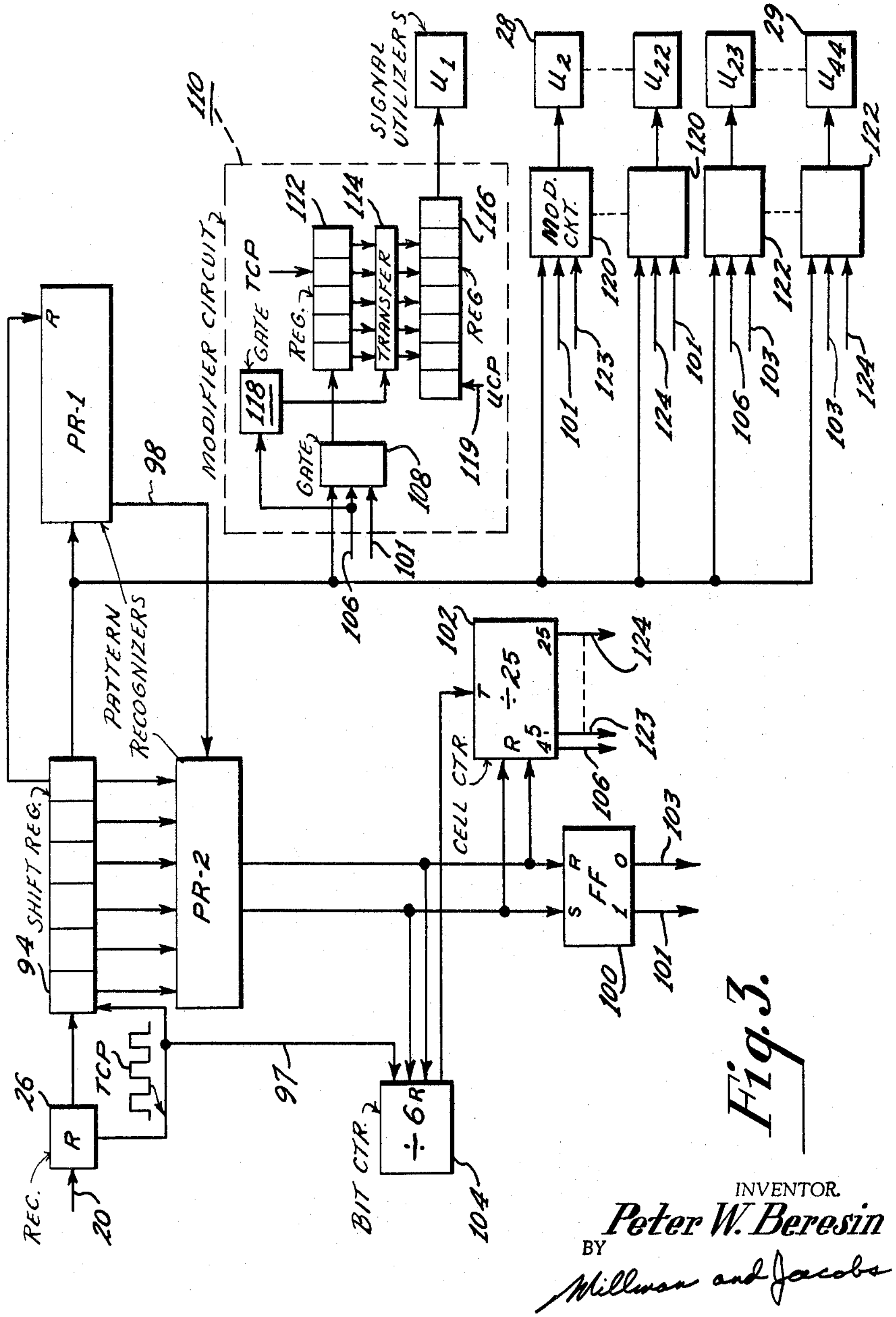
FIG. 3 is a schematic block diagram of one form of demultiplexer used in the system of FIG. 1.

A schematic block diagram of the demultiplexer DM–1 is shown in FIG. 3. The multiplexed signals transmitted over the cable 20 are demodulated by the receiver 26 and applied to the shift register 94 in series and continuously. The receiver 26 is also utilized to generate a train of pulses TCP at the bit transmission rate and in synchronism with the message signals. The pulses TCP are used as shift pulses for the register 94 and as timing pulses for various other parts of the system.

The serial bits that are continuously and successively established in register 94 are effectively supplied to a pattern recognition circuit PR–1. The latter operates to detect the pattern of eleven successive 1-bits established in the first two cells 64 and 66 of each message. This succession of eleven bits is unique, as explained above, in view of the use of an odd-parity check bit as the sixth bit of each six-bit cell. The circuit PR–1 may be simply a counter that divides by 11 and is reset each time it receives an 0-bit from the last stage of register 94; thereby, it produces an output signal on line 98 only when the eleven successive 1-bits of the first two cells are counted.

A second pattern recognition circuit PR–2 receives the six bits established at any instant in the input register 94. PR–2 is arranged to recognize either of the two patterns of bits that form the third cell 68 of each message. Whenever PR–2 recognizes one or the other of the two patterns for the third cell, and at the same time receives a signal on line 98 indicating recognition of the first two message cells, an output signal is supplied on one or the other of two output lines that set and reset, respectively, a flip-flop 100. The outputs of PR–2 are also supplied to a cell counter 102 which is reset when either of the two patterns of the third message cell 68 are recognized by PR–2; cell counter 102 is triggered successively by output pulses from a divide-by-6 counter 104; the latter counts the six bit pulses TCP for each cell and supplies a pulse each time six bits are counted.

The cell counter 102 has 22 output lines representing the successive counts after it is reset, which represent the cells 4 to 25 of the message. The fourth cell line 106 is connected as an input to a gate 108 of a modifier circuit 110 associated with U–1 to which that fourth cell is to be directed. The gate 108 also receives the successive outputs from the input register 94 as well as the 1-output line 101 of FF–100. The output of gate 108 is supplied to a 5-stage shift register 112 that is shifted synchronously by the TCP pulses when gate 108 is open. The circuit 110 is so arranged that only the first five data bits of an information cell are shifted into the register 112, the sixth bit being discarded appropriately by the closing of the gate 108. The outputs of register 112 are transferred in parallel to corresponding stages of an output register 116 which is shown schematically as having additional stages to provide a seven-stage register. The first stage is effective to produce a start (space) signal, and the last stage is appropriate to generate a stop (mark) signal. Thereby, the original character supplied by the first source S–1 (FIG. 2) is reestablished in register 116. The transfer from register 112 to register 116 takes place via transfer gates 114 under control of a circuit 118 which supplies a transfer signal when the associated line 106 is no longer enabling gate 108 so that the complete fourth cell is known to be established in register 112. Thereafter, shift pulses UCP are supplied via line 119 to register 116 at an appropriate rate corresponding to the operating rate for the utilization device U–1 which receives the successive outputs from the register 116.

In a similar fashion, a modifier circuit 120 is provided that is the same in construction as circuit 110 except that it is enabled by line 123 from cell counter 102 and by line 101 of message FF–100 when the fifth cell of the odd-numbered message is established in the input register 94. Circuit 120 also receives the outputs from input register 94. The output of this buffer 120 is supplied to U–2 at the slow rate of UCP. Similarly, each of the other utilization devices has an associated modifier circuit 120 including the last such device U–22, and each of the modifier circuits 120 receives the associated output line of counter 102 corresponding to the associated message cell. Thus, the modifier circuit 120 for U–22 is enabled by lines 124 and 101 corresponding to the 25th cell of the odd-numbered message.

Modifier circuits 122, similar to the circuit 110, are provided for the utilization devices U–23 to U–44, and each one receives the output signals from register 94, the 0-output line 103 of FF–100 as well as the respective output lines 106, 123, 124 for the associated information cells. These modifiers 122 operate in the manner described above to distribute the information cells of the even-numbered message to U–23 to –44.

In operation, the first message received by the demultiplexer of FIG. 3 has its bits continuously supplied to input register 94; the 0-bit of the first cell 64 (FIG. 2) is effective to reset PR–1, which thereafter recognizes the eleven 1-bits in the first two cells 64 and 66 to provide an enabling signal on line 98. When the third cell 68 is established in the input register 94, it is recognized by PR–2 in association with the recognition signal on line 98 to set FF–100 and supply an enabling signal on the 1-output line 101, which is effective to prime the gates 108 of each of the modifier circuits 110 and 120 associated with U–1 to U–22. Thereafter, when the fourth cell (the first information cell) is established in register 94, counter 102 is stepped to enable line 106, which opens gate 108 to pass the first five information bits of that cell into register 112. These information bits are then transferred to the output register 116, and then shift pulses UCP are supplied to that register at an appropriate rate for U–1 with the first character sent out having its start and stop signals restored in the first and seventh positions of the character.

When the fifth information cell is established in register 94, the counter 102 is stepped to enable line 123, and modifier circuit 120 is then enabled to receive that second information cell, modify it, and send it to U–2 in a similar fashion. This operation is then repeated for the remaining information cells of the first message, with line 124 being enabled for the twenty-second such cell, which is sent to U–22.

The beginning of the second message follows immediately after the end of the first message, and a similar operation is again performed by PR–1 and PR–2 to recognize the first three cells 64, 66, and 68 of the second message. This recognition results in resetting FF–100 as well as cell counter 102 and ÷6 counter 104. Accordingly, modifiers 122 have their associated input gates enabled by line 103 of message FF–102 and successively enabled by the lines 106, 123, and 124 of cell counter 102. Thereby, the successive 22 information cells are successively supplied to the buffer circuits 122 individually associated with the utilization devices U–23 to U–44.

Another cycle of messages follows thereafter with an odd-numbered message being recognized in PR–1 and PR–2 to again set FF–100 and enable the modifier circuits 110 and 120 associated with U–1 to U–22. The above described cycle of operation is then repeated and continues indefinitely.

Thus, the multiplexer (FIG. 2) successively generates two different messages, each associated with a different group of the data sources S–1 to S–22 and S–23 to S–44. Each of these two messages is preceded by a 3-cell synchronization pattern in which the third cell is different for each of the two types of messages. The multiplexer is effective to transmit a character from each of the first group of sources S–1 to S–22 during each first type message and a character from the other sources S–23 to S–44 during each second type message. The demultiplexer is effective to recognize which of the two types of messages is being sent and distributes the successive information cells in each one successively to the utilization devices associated with that message.

The unique synchronization pattern of eleven 1-bits ensures a very high degree of reliability in the synchronization of the demultiplexer. The start and stop bits of the Teletype characters are not transmitted which results in an effective higher data transmission rate. Moreover, circuitry normally required to handle those bits, e.g., that associated in registers with the start and stop bits, is not required. The use of a parity check bit for each cell ensures reliable error checking, and at the same time makes it possible to develop a unique synchronization pattern in the first two message cells. The number of bits of transmission saved by the stripping of the start and stop bits from the Teletype characters ordinarily more than compensates for the additional bits provided in the synchronization pattern and the error checking bits. By breaking down the multiplexing cycle into two message sub-cycles, the loss of information due to the unavoidable occurrence of spurious signals is reduced. That is, if one of the messages is lost, the information in the other message need not be lost since synchronization for the latter can be restored. Also, the synchronization pattern for the two messages is distinct, so that when the synchronization for either one is lost, the synchronization for the other is restored in the correct portion of the demultiplexing cycle. This invention is not limited in its application to any particular size of information unit and, in principle, may be used for multiplexing any information unit from a single bit to any desired number of bits in combination. Moreover, as is described in detail below in connection with FIGS. 8 and 9, this invention may be used to multiplex information units of different sizes coming from the different sources, and it may also be used to multiplex information coming in at different rates from the different sources. Where one source is at a very much higher rate than others, that one source may be multiplexed in with each message, and the remaining sources arranged in a plurality of groups that form the remainder of the respective messages.

In the particular example set forth of a source rate of 50 c.p.s. and a multiplex transmission rate of 2.4 kc., each teletype character is 150 milliseconds in length, and each character from the 44 sources is processed once every 125 ms. Thus, the multiplexer sends out information faster than all of the sources together can supply. Accordingly, about once every six characters, a Teletype modifier circuit does not have a character available for the multiplex transmission; and therefore, a blank character is transmitted. As explained below, the demultiplexer recognizes this blank character and does not send it on to the utilization device.

Figure 4:
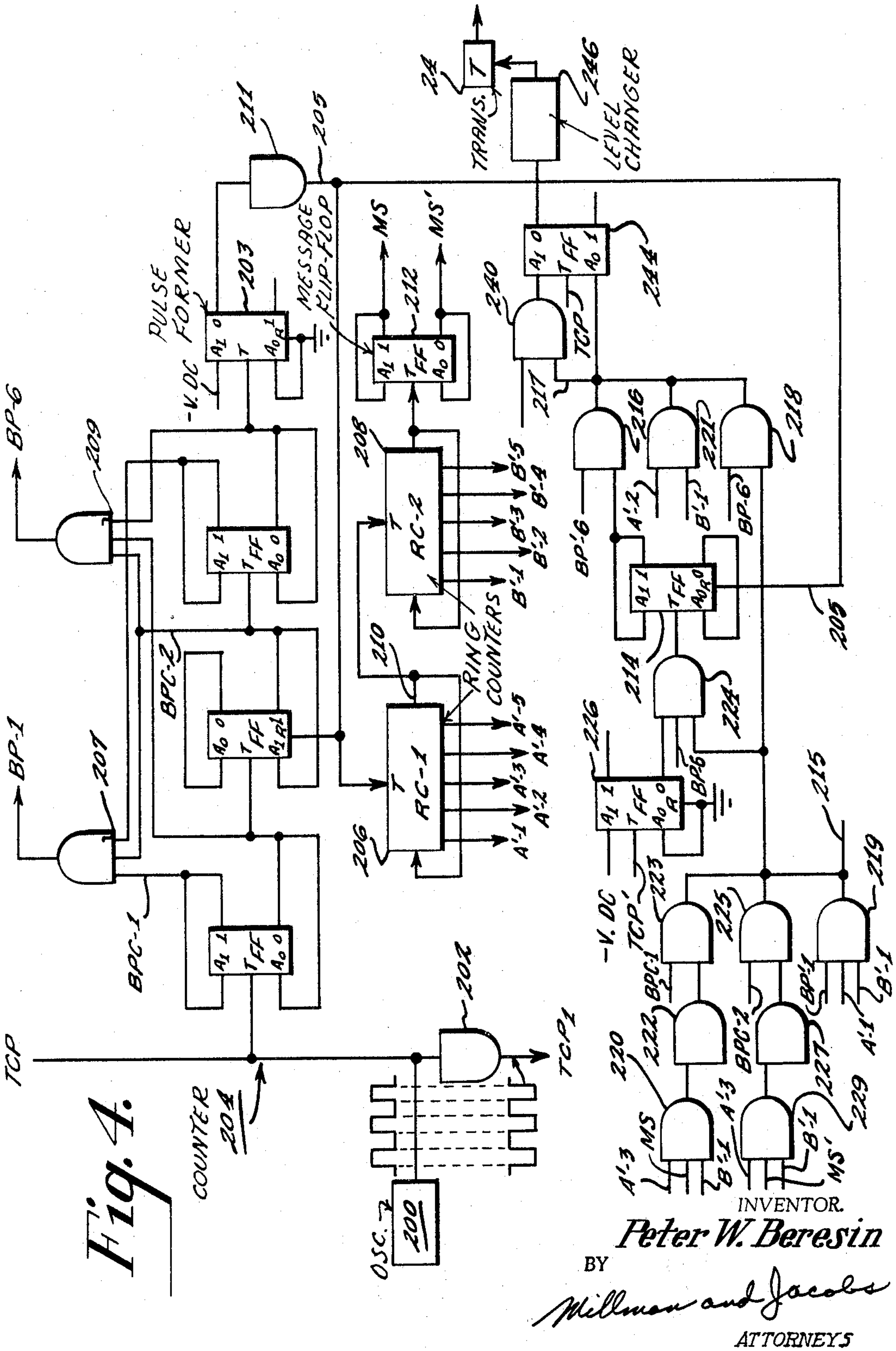
FIGS. 4 and 5 are schematic detailed block diagrams of parts of the multiplexer of FIG. 2.
Figure 5:
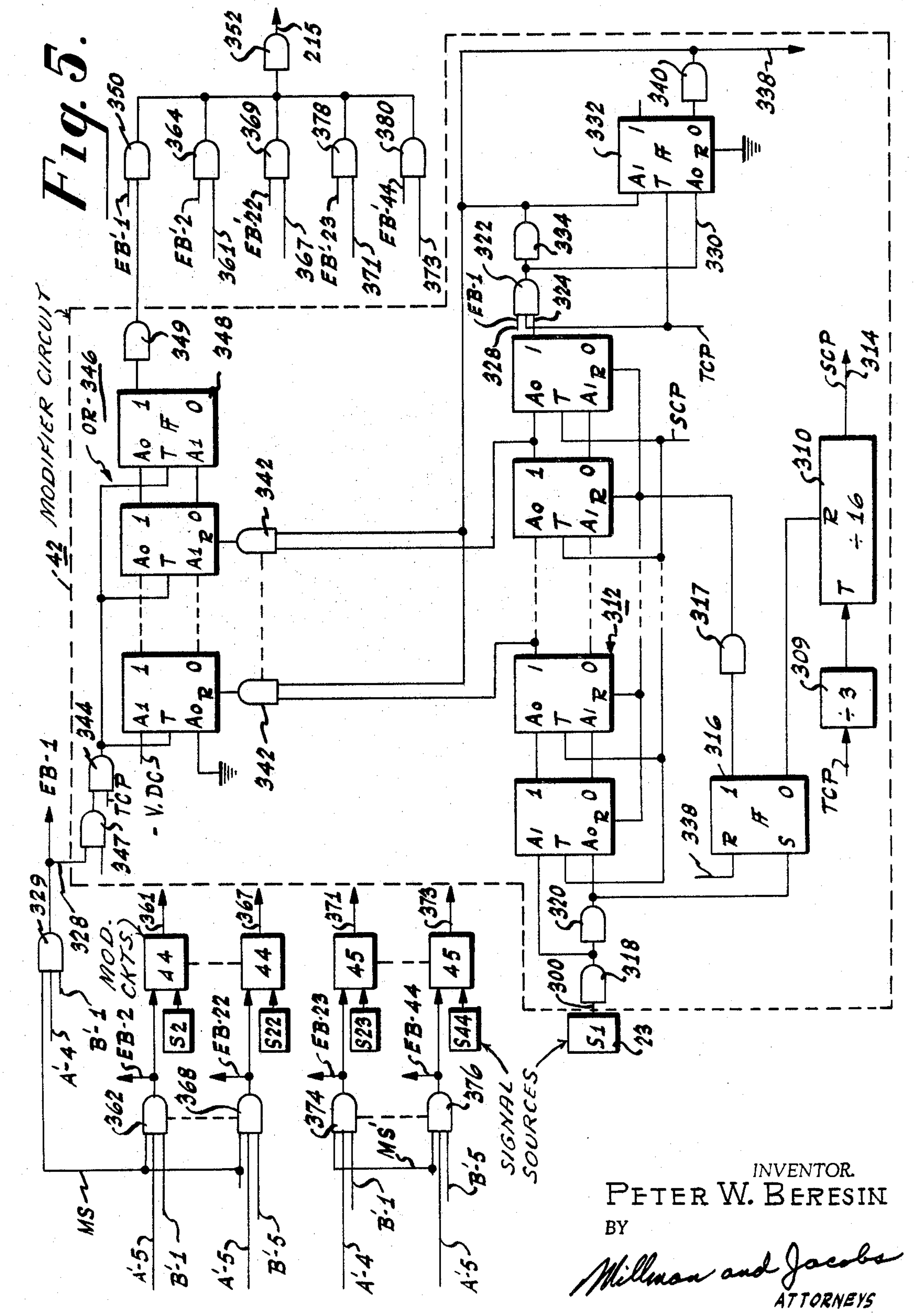

The description of the first multiplexer MP–1 is described in detail in conjunction with FIGS. 4 and 5. Shown in FIG. 4 is the control unit for the multiplexer. A freely running oscillator 200 operates at a 2.4 kilocycle frequency (the bit transmission rate that is assumed as an example for the transmitter 24 and cable 20) and supplies a continuous pulse train TCP and inverted pulses TCP′ via an inverter 202. These pulses are used for timing throughout the system.

TCP pulses are supplied to a bit position counter 204 that divides by 6 the TCP frequency and provides a pulse on line 205 at each sixth pulse so as to define a message cell.

Counter 204 is a 3-stage binary counter; TCP is connected to the trigger input of the first stage; the 0-output of the first stage is connected to the T-input of the second stage; and the 1-output of the second stage is connected to the T-input of the third stage. The 0-output of the third stage is connected via a flip-flop pulse former 203 that produces a narrow pulse and an inverter 211 to line 205, which is connected back to the R-input of the second counter stage. Thereby, the counter steps through the following six binary states successively in accordance with the usual binary representation: 000, 001, 110, 111, 100, 101, and back to 000.

Line 205 is connected to the trigger or shift input of a 5-stage ring counter (RC–1) 206 that may be formed from a recirculating serial shift register. A single 1-bit is shifted to successive stages of RC–1 and completely circulated through the ring from the first to the last and back to the first stage upon receiving five pulses from the bit position counter 204. A second similar ring counter (RC–2) 208 operates in the same manner, with its 1-bit being shifted by pulses received via line 210 from the last stage of RC–1 at the end of a complete cycle. Thus, upon every five cycles of the 1-bit in RC–1, a complete circulation of the 1-bit is completed in RC–2. Five output lines A′–1 to –5 and B′–1 to –5 from RC–1 and –2 are used in combinations of an A and B line to generate a total of 25 signal combinations (five different A-signals for each of the five B-signals) that define the 25 cells of each of the messages that are transmitted. Thus, RC–1 and RC–2 cooperate to provide a divide-by-25 counter. A message flip-flop 212 is connected as a single stage binary counter and changes state upon each pulse from the last stage of the ring counter B, i.e. upon completion of each message. Its two outputs MS and MS′ respectively represent the odd and even-numbered messages that are alternately transmitted.

Connected to different combinations of the outputs of the three stages of the bit position counter 204 are NOR gates 207 and 209. The output of gate 207, labelled BP–1, is a gate-disabling signal during the first bit of each cell and an enabling signal during the remaining five bits of the cell. The signal BP–6 from gate 209 is an enabling signal during the first through fifth bits of each cell, and is a disabling signal during the sixth bit. The inverse of any signal, represented by the addition of a prime (′), has the reverse characteristics. In the following description, the inverse of any desired signal is obtained by passing it through an inverter.

NOR gates are used throughout the description and are represented by the same symbol. Any suitable circuit may be used, such as a diode AND gate followed by an inverter amplifier.

The logic circuits shown in the drawings are based on binary "1" and "0." The symbole for the inverters is used represent the binary digits; particularly these circuits operate with ground potential as the nigh signal and a negative voltage as the low signal, respectively representing binay "1" and "0." The symbol for the inverters is used to represent a module having three (or more) inputs and an output. This module functions as a binary inverter when only one of the inputs is used and functions as a NOR gate when two or more inputs are used. The flip-flop is a module used throughout the logic and is formed by a circuit that includes two regeneratively cross-coupled NOR gates together with a capacitor-coupled steering circuit for steering a positive-going trigger pulse applied to the T-input in accordance with voltage levels applied to the 1- and 0-inputs. The flip-flop is set by such a trigger pulse when high and low voltage levels are respectively applied to the 0- and 1-inputs; and it is reset when the opposite voltage levels are applied to those inputs. The levels at the 0- and 1-outputs of each flip-flop are the inverted form of the corresponding inputs; that is, the 0- and 1-outputs are respectively low and high voltage levels when set (to represent a binary "1"), and these outputs are respectively high and low when reset (to represent a binary "0"). In addition, the flip-flops have an R-input which resets the flip-flop when a high voltage signal is applied thereto.

Four gates 219, 221, 223, and 225 are used to develop the synchronization patterns of the two messages in a manner similar to that described above in connection with pattern generators 56, 58, 60, and 62 (FIG. 2).

Gate 219 receives as inputs the A′–1 and B′–1 signals together with the BP′–1 signal. Accordingly, during the first bit of the first cell, all of the inputs to gate 219 are low, and its output is high; this high output represents a 0-bit, due to a subsequent inversion taking place via gate 218 which passes the signal to output line 217. During the remaining five-bit times of the first cell, BP′–1 is high so that the output of gate 219 is low, which represents 1-bits. Thus, the first cell of the synchronization pattern is generated by gate 219 in the form of 011111.

The first five bits of the first cell pattern are pressed via line 215 through gate 218 to output line 217 since an enabling low signal is provided by BP–6 during these first five bits of the cell. These bits are also supplied via gate 224 which is also enabled by BP–6 during the first five bits and clocked through by the TCP′ pulses (which are supplied by a pulse former flip-flop 226 in order to ensure sharp, narrow pulses). The outputs of gate 224 are high for 1-bits, and they serve to successively trigger parity counter 214 in the form of a single-stage binary counter. This counter 214 is reset via line 205 at the start of the cell, so that its state after five bits are supplied to it represents the oddness or evenness of the number of 1-bits in the first five bits of the cell. The output of the counter from its 1-output is supplied to gate 216 together with BP′–6, and the output of gate 216 at line 217 represents a 1-bit or a 0-bit as required to ensure that the overall cell is odd parity. Thus, in the case of the first cell, a 1-bit is supplied by gate 216.

The second cell of the synchronization pattern is generated in gate 221 which is enabled by its inputs A′–2 and B′–1, which are both low during the second cell time. Accordingly, the six-bit outputs of gate 221 during cell-2 are all 1-bits which are supplied directly to the line 217 without inversion. The parity generator circuits 214, 214, 216 are bypassed, since this second cell does not have odd parity.

During the third cell time of the first message, the inputs A′–3, MS, and B′–1 of gate 220 are all low, and its output is supplied via inverter 222 to gate 223 together with the 1-output BPC–1 of the first stage of bit position counter 204. Accordingly, gate 223 is enabled to pass the successive signals developed at BPC–1 during the third cell, and these signals are 010101 as they are ultimately produced on line 217 after passing gate 218 and with the parity bit generated as the sixth bit in the manner described above.

During the alternate or even-numbered messages, gate 229 is enabled by MS′ during the third cell (as determined by A′–3 and B′–1). Accordingly, the output of gate 229 via inverter 227 enables gate 225 to pass BPC–2 which is the 1-output of the second stage of the bit position counter. Accordingly, the output of gate 225 is supplied to line 217 via gate 218, and a parity bit is generated in the sixth bit in the manner described above to produce the bits in succession of 001101. Line 217 is connected directly and via an inverter 240 to the 0- and 1-inputs of an output flip-flop 244. The 0-output of FF–244 is applied to a suitable level changer circuit 246 which adapts the output of the flip-flop to appropriate signal levels and forms for operating the transmitter 24. FF–244 is successively triggered by the TCP clock pulses to synchronize the bit transmission at the desired rate. For some transmitter circuits, it is also necessary to supply TCP directly to the transmitter itself. It may be necessary to delay somewhat the TCP pulses applied to FF–244 since the same TCP is used to develop the other inputs to that flip flop. That is, the data inputs should be applied sufficiently in advance of the trigger TCP to permit any transient signals to become fully established.

The detailed logic of the modifier circuit 42 is shown in FIG. 5. The signals from S–1, which are assumed to be in the form commonly used for Teletype, are supplied via line 300 and inverter 318 to the 1-input, and via inverter 320 to the 0-input of the first flip-flop stage of an input register IR–312. IR–312 is a 7-stage shift register in which the central three stages are omitted from the drawing for simplicity of illustration. These seven stages of IR–312 respectively receive the seven bits of the standard Teletype character.

TCP clock pulses at 2.4 kc. are divided down to a 50 cycle-per-second (c.p.s.) rate on line 314; this is done in two stages by a divide-by-3 counter 309 connected to the T-input of a divide-by-16 counter 310, the output of which supplies the desired pulses on line 314. This line 314 is connected to the T-inputs of the stages of IR–312 to serve as shift pulses at the rate of the source 23.

When the first space signal occurs (corresponding to the start signal of the input Teletype character), the output of inverter 22 sets FF–316, and its 0-output connected to the reset input of counter 310 removes a resetting signal to permit the counter to count and produce its output pulses for shifting IR–312 to accept the Teletype character. Thereby, the shift pulses are synchronized to the bits of the Teletype character. Just prior to the receipt of this first space input, FF–316 had been in reset condition, and its 1-output via inverter 317 was effective to maintain all of the stages of IR–312 in the reset condition.

Thus, the seven bits of the Teletype character are successively shifted through the seven stages of IR–312 until the first space signal (the start signal) reaches the last stage of IR–312. The latter's 1-output 324 is supplied to a gate 322 together with the TCP pulse as well as a signal EB–1 on line 328. The latter signal is developed by a gate 329, which receives as inputs A′–4 and B′–1 corresponding to the fourth message cell together with the MS signal corresponding to the first or odd-numbered messages. Thus, the output of gate 329 is a signal EB–1 which is a high level signal during the fourth cell of every odd-numbered message, and is otherwise a low level signal.

Thus, gate 322 is enabled by EB–1 at a time prior to such a fourth cell time period when the space signal of a Teletype character is established in the last stage of IR–312. The output of gate 322 via inverter 334 enables a set of five transfer gates 342 that are respectively connected at their inputs to the 1-outputs of the five central stages of IR–312, and at their outputs to the R-inputs of a 5-stage output register (OR) 346. The three intermediate stage transfer gates 342 and the three intermediate stages of OR–346 are omitted for simplicity of illustration, and their construction is otherwise the same as their counter-parts that are illustrated. Accordingly, when a full teletype characer is established in IR–312, this condition is recognized by gate 322 to produce a transfer signal for gates 342 so that the five data bits of the character are transferred as five bits into the 5-stage OR–346 in parallel. The space and marking (start-stop) signals in the first and last stages of IR–312 are not transferred and thus, are effectively discarded.

The start recognition signal from gate 322 is applied via line 330 and inverter 334 as steering inputs to a pulse former flip-flop 332 that has its R-input connected to ground. After the transfer has taken place via gates 342, the next TCP clock pulse triggers FF–332 to produce a narrow pulse at its 0-output that is passed via inverter 340 to line 338. This pulse resets FF–316; and the 1-output of the latter, via inverter 317, resets all of the stages of IR–312. During this transition condition of the resetting of IR–312, the pulse on line 338 is effective to override a transfer signal from inverter 334 and close gates 342 so that no transfer takes place in the transition of the resetting of IR–312.

The five data bits are established in OR–346 and ready to be transmitted upon occurrence of the fourth cell of the next odd-numbered message. At the beginning of that cell, gate 329 generates EB–1 which is supplied to gate 344 via inverter 347 together with a TCP; the output of gate 344 is applied to the T-inputs of all of the stages of OR–346 to shift out the character therein. An additional FF–348 is added as an output stage of OR–346 to decouple the last stage output from a gate 350 during the transition conditions. The gate 350 is enabled by the inverted signal EB′–1 during the fourth cell at the same time that the TCP clock pulses are shifting the information out of OR–346 in series and via FF–348 and an inverter 349 into gate 350 and via an inverter 352 to line 215.

As described above in connection with FIG. 4, line 215 is connected to the gate 218 to send out the first five bits of the fourth cell on line 217. Line 215 is also connected to gate 224 and parity counter 214 which generates the sixth parity bit via gate 216 out onto the line 217 in proper time relation. Thereby, the fourth cell is transmitted immediately following the third cell.

The modifier circuit 44 provided for the S–2 source is similarly constructed and operated, and it is controlled by an EB–2 signal that is generated by a gate 362 that receives the input signals corresponding to an odd-numbered message and the fifth cell. The output of the S–2 modifier on line 361 is also supplied to a gate 364 that receives the EB′–2 signal and supplies the five data bits of a character from S–2 via inverter 352 to the output line 215. Similar modifiers are supplied for each of the other sources of the first group as indicated by the dotted line, and that for the S–22 source also receives the EB–22 signal generated by gate 368 during odd-numbered messages and the 25th cell time. The output of modifier 366 on line 367 is passed via gate 368 enabled by the inverted signal EB′–22 out onto the output line 215. For the second group of sources for S–23 to S–44, modifiers are provided that are enabled by their associated EB signals produced by gates 374 and 376, respectively, that are enabled during even-numbered messages and during the fourth through 25th cell times thereof. The outputs of these modifiers are supplied via lines 371, 373 to output gates 378, 380, respectively, that also receive the EB′–23 and –24 signals. The outputs of these gates are also passed in the manner described above to the output line 215 and out to the transmitter.

Figure 6:
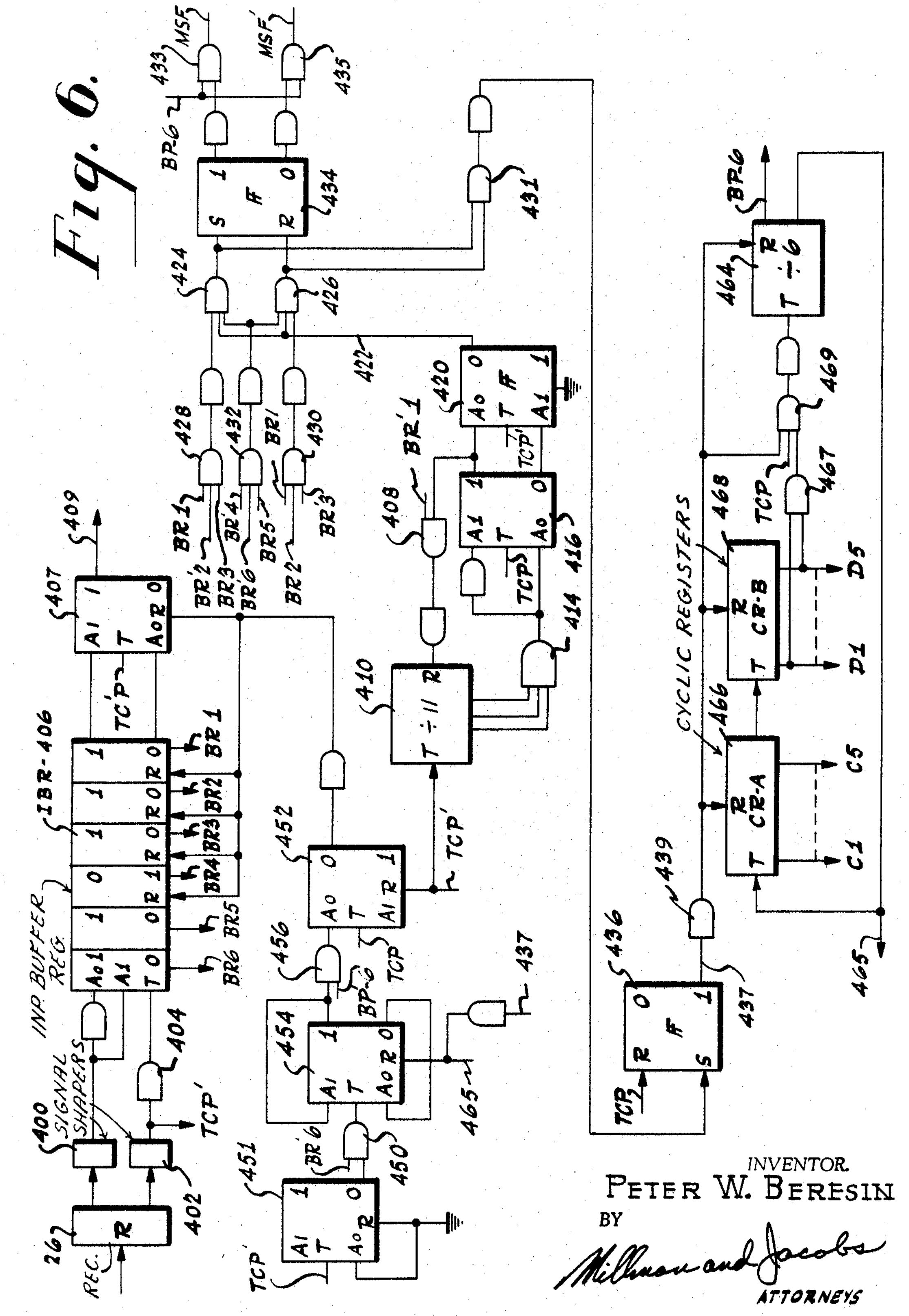
FIGS. 6 and 7 are schematic detailed block diagrams of parts of the demultiplexer of FIG. 3.

The signals supplied by the receiver 26 to DM–1 (FIG. 6) include the message signals via a suitable signal shaper circuit 400 as well as the TCP′ clock pulses via a shaper 402. These signals are supplied in suitable form for operation of the DM–1 circuits by means of the shapers 400, 402. The receiver 26 generates the 2.4 kc. clock pulses TCP from the received data in any suitable fashion. One way that this may be done is to provide a 2.4 kc. pulse generator that is resynchronized each time a transition occurs in the data from one bit type to the other.

A 6-stage input buffer register (IBR) 406 in the form of a shift register (similar to IR–312, FIG. 5) receives the message signals at its first stage. These signals are shifted successively through the register by TCP. Output lines from the first to the last stage are respectively represented by BR–6 to BR–1, and these lines represent the corresponding bits of a cell that may be registered in IBR at any instant. The inverted form of these signals is readily obtained by placing them through an inverter or by taking the opposite side of any register stage, and various combinations of these signals are utilized as described hereinafter.

A divide-by-11 counter 410 is provided which counts the bit pulses TCP. This counter is a 4-stage binary counter that is reset upon a count of 11 by means of the outputs from the first, second, and fourth stages of counter 410 and a gate 414, which receives those outputs. Gate 414 is enabled upon the count of 11 to provide a signal that is used to set FF–416 upon the next TCP. The output of FF–416 is applied to an OR gate 418 together with BR′–1 (representing a 0-bit in the last stage of IBR), and the output of gate 408 is effective to reset counter 410 to start its count again. Accordingly, counter 410 is reset each time it counts to a count of 11 or whenever a 0-bit occurs in the sixth stage of IBR.

Counter 410 is effective during the first two cells of any message; that is, the first bit of the first cell is a 0-bit which resets counter 410 via gate 408 when the 0-bit is established in the sixth stage of IBR. Thereafter, no further 0-bits occur in the first two message cells so that counter 410 continues to count successive clock pulses through a count of 11. Thereupon, counter 410 is reset via gate 414, FF–416 and gate 408. This setting of FF–416 upon a count of 11 is effective to set FF–420 upon the next TCP′; FF–420 is connected as a pulse former since its R-input is connected to ground, and it produces a narrowed pulse on line 422 upon being momentarily set.

When the pulse is generated on line 422, the third cell of the message is then established in IBR 406 (twelve TCP have passed since the first 0-bit was established in the last stage of IBR). The outputs BR–1 to –6 (in their inverted forms) are applied combinatorially to three gates 428, 430, 432, the outputs of which are connected via inverters to two gates 424 and 426 together with the line 422. This combination of gates is effective to recognize if either of the two special patterns for the third cell of the message is then established in IBR. That is, gate 424 is enabled if the cell established in IBR is 010101 (which is recognized by the combination of gates 428 and 432); and gate 426 is enabled where the third cell in IBR is 001101 (which is recognized by the combination of gates 430 and 432). The pulse on line 422 passed by gate 424 is effective to set FF–434, and the pulse on line 422 passed by gate 426 is effective to reset FF–434. The 1-output of FF–434 is connected via an inverter to a gate 433; and the 0-output is connected to a gate 435, each of which gates receives a signal BP–6. The outputs of these gates are signals MSF and MSF′ which respectively represent an odd-numbered and an even-numbered message. Due to the disabling signal BP–6 during the sixth bit, these message signals are not effective at that time.

An OR gate 431 passes a pulse produced by either gate 424 or 426, which is used via an inverter to set FF–436, which is immediately reset thereafter by a pulse TCP. The 1-output 437 of FF–436 is applied via inverter 439 to the R-inputs of two cyclic registers (CR–A, CR–B) 466 and 468. CR–A is a 5-stage ring counter similar in construction to RC–1 (FIG. 4) except that the third stage is inverted with respect to the remaining stages; thereby, a 1-bit is effectively placed in the third stage when it is reset so that it starts with a count of 3. CR–B is also a 5-stage shift register, but it is not connected as a ring counter and stops counting after being stepped through a count of 5. CR–B has its first stage inverted with respect to the other stages so that it has a 1-bit inserted in that first stage upon reset to start with a count of 1. Output lines C–1 to C–5 are respectively the outputs of the five stages of CR–A; and output lines D–1 to D–5 are respectively the outputs of the five stages of CR–B. The D–1 to D–5 lines are the inputs to a gate 467 which is fully enabled when a 1-bit is no longer stored in CR–B (i.e. after it has been stepped through a count of 5). The output of gate 467 under the latter circumstances closes gate 469, which is otherwise effective to pass the clock pulses TCP via an inverter to trigger a bit position counter 464. The latter is connected as a divide-by-6 counter in the same fashion as bit position counter 204.

Counter 464 is reset at the same time as CR–A and CR–B, and gate 469 is disabled from passing clock pulses during the reset. The output 465 of counter 464 is connected to the trigger input of CR–A to step that ring counter; and the overflow pulse from CR–A as it recycles at a count of 5 is used as an input stepping pulse for CR–B. Counter 464 also provides the signal BP–6 during the sixth bit of each cell (in a manner similar to that in FIG. 4 described above).

After CR–A and –B have stepped through their full cycle, corresponding to the 25th cell of a message, gate 467 recognizes this condition and disables gate 469 from passing further TCP pulses to the counter 464. Accordingly, all three counters 464, 466, and 468 are stalled at this time and remain stalled until they are reset following the third cell of the next message when FF–436 is again set. Thus, none of the D–1 to D–5 signals is available during the first three cells of the message corresponding to the synchronizing pattern cells.

The output line 465 of counter 464 is connected to the R-input of a parity counter 454; the output 437 of FF–436 is also connected via an inverter to the R-input of this counter. Thereby, the counter 454 is reset upon each cell being counted, starting with the completion of the third cell of each message.

The gate 450 monitors the incoming bits for purposes of a parity check, and for this purpose, the output line BR′–1 of the first stage of IBR–406 is connected as an input to gate 450 with the TCP′ pulse narrowed in a pulse former 451. Accordingly, the output of gate 450 triggers parity counter 454 upon each 1-bit being established in the first stage of IBR. After a full six-bit data cell has been received by IBR, the state of counter 454 corresponds to the number of 1-bits within the data cell. If an odd number of 1-bits are included within the data cell (which condition corresponds to proper parity), a high signal is established at the 1-output of counter 454 which disables gate 456, and the data cell in IBR is not affected. However, if there is improper parity within the data cell, as indicated by an even number of 1-bits, the 1-output of counter 454 enables gate 456 during the sixth bit of that cell together with BP′–6. The gate output sets FF–452 during the succeeding TCP; FF–452 is reset upon the following TCP, and the pulse produced at its 0-output is applied via an inverter to the R-inputs of the last four stages of IBR as well as to a buffer FF–407, which is connected as an extra stage to the output stage of IBR, and which also is connected in a relatively inverted relationship. The generation of this resetting pulse by FF–452 takes place at the same time that TCP has started to shift IBR so that the four stages of IBR that are reset as well as FF–407 contain the five data bits of a character. The resetting of those five stages is effective to insert the code 10001 into those five stages since stage 407 has an inverted relationship, and the third stage of IBR also has an inverted relationship to the other stages of that register. This code 10001 is recognized by the Teletype utilization device as an error character and is so treated and printed.

Figure 7:
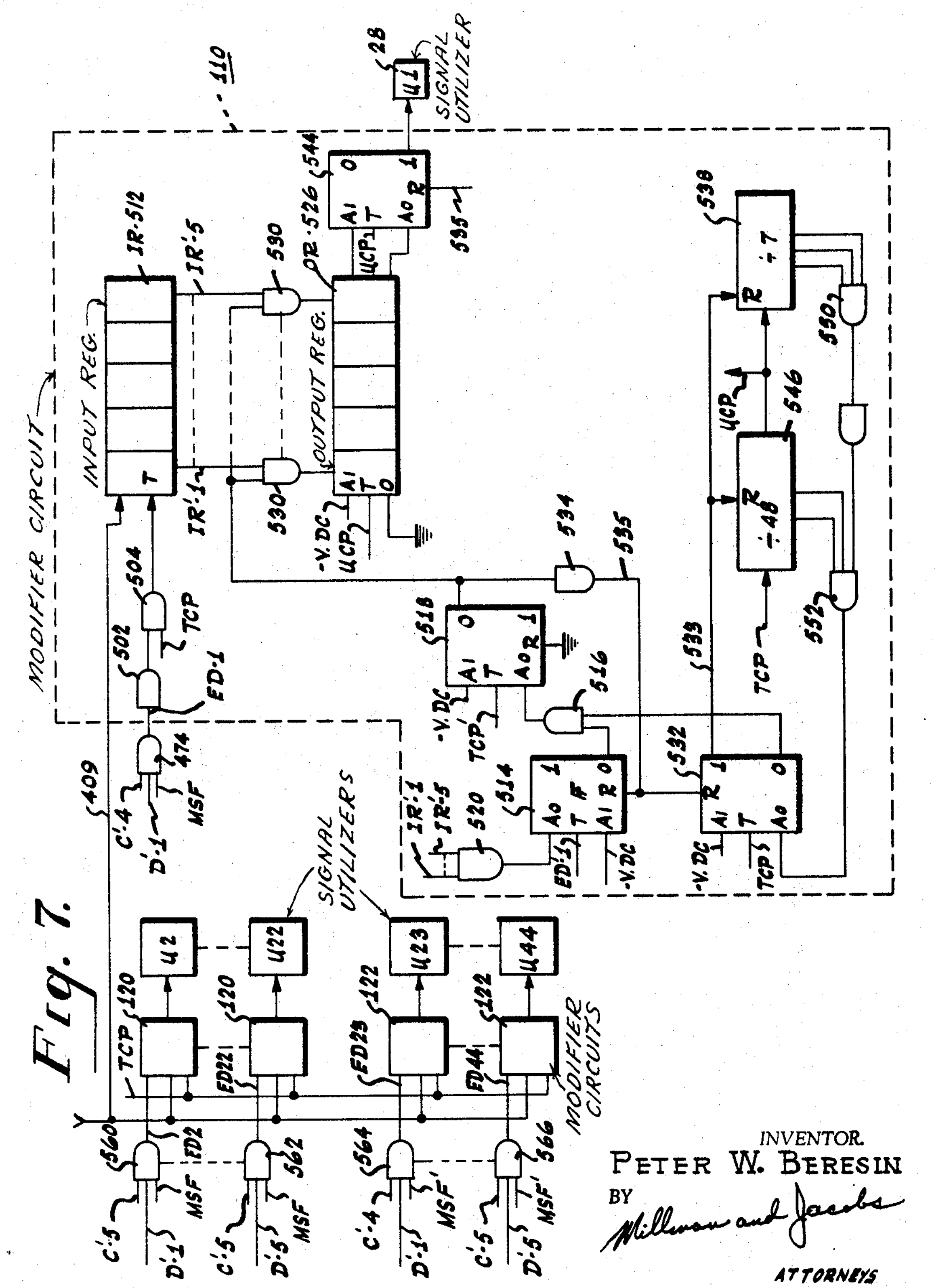

The data signals from IBR–406 that are developed on line 409 (FIG. 6) are fed to each of the modifiers 110, 120, 122 (FIG. 3) that are individually associated with the utilization devices U–1 to –44. The detailed logic of circuit 110 is shown in FIG. 7. It includes a gate 474 that is operated during the fourth cell of each odd-numbered message (by the C′–4, D′–1, and MSF signals) to develop the signal ED–1; the latter is effective via inverter 502 to open gate 504 to pass TCP pulses that are used to shift the data signals into a 5-stage input register IR–512 (of the same type as register 346, FIG. 5). In view of the operation of gates 433 and 435, the MSF and MSF′ signals are enabling for onlyl five bits; therefore, the ED–1 signal is effective also for only five bits, and the shift pulses terminate after the five data bits of a character are established in IR–512.

Upon termination of ED–1 at the end of the fifth bit, it is effective to apply a trigger pulse to a detect FF–514, which is set by the output of a gate 520, the five inputs to which are the outputs IR′–1 to –5 of the five stages of register 512. That is, if any of the stages of register 512 includes a 1-bit, FF–514 is set; and its 0-output is then effective to enable gate 516 with the 0-output of FF–532, the latter being effective when the output register OR–526 is cleared and ready to receive the character in IR–512.

Under those conditions, the output of gate 516 enables FF–518 to produce a narrowed pulse upon the occurrence of the next TCP′, which pulse at the 0-output thereof enables a set of five transfer gates 530 to pass the five outputs from input register 512 to reset the corresponding five stages of OR–526. The pulse from FF–518 is also effective via inverter 534 and line 535 to reset FF–514 and FF–532.

The 1-output 533 of FF–532 is connected to the R-inputs of a divide-by-7 counter 538 (in the form of a three-stage binary counter) and a divide-by-48 counter 546 (which may be similar in construction to the counters 309 and 310, FIG. 5). Thus, when FF–532 is reset, counter 546 counts the TCP pulses supplied thereto and produces narrow pulses UCP at the desired rate of transmission of the associated utilization device (i.e. 50 c.p.s.). These pulses UCP are used as shift pulses for OR–526 as well as for an extra output stage FF–544 for OR–526. FF–544 is reset by the output of gate 534 when the transfer takes place from IR–512 to OR– 526, and effectively, FF–544 supplies a 1-bit or space signal as the first bit of a seven-bit output character that is generated. The 1-output of the output stage 544 is supplied to U–1 which may be a suitable input circuit for a Teletype line or printer such as the driver circuit for a relay that is used for such Teletype lines. The first UCP is effective to shift the first data bit into the output stage 544 and also to insert a 0-bit or mark signal into the first stage of output register 526 (the inputs of this first stage are fixed to generate this signal condition at that time).

The UCP pulses are also scupplied to the T-input of counter 538, and when the latter acquires a count of 7, gate 550 (which receives the associated outputs) supplies a signal via an inverter to enable gate 552. The latter also receives output lines from counter 546 corresponding to a count of 18; and when that additional count is reached after the count of 7 in counter 538, gate 552 initiates the setting of FF–532, which terminates the output cycle and initiates the next output cycle. The signals generated at the 1-output of FF–544 are approximately 20 milliseconds in length as determined by the UCP pulses. However, the seventh bit, the stop bit in the form of a mark signal, is somewhat lengthened as is conventional to about 27 ms. by the extra time supplied by gate 552 when it delays the setting of FF–532.

The setting of FF–532 again enables gate 516 to produce a transfer pulse from pulse former FF–518 that transfers the next character, which in the interim has been established in IR–512, to OR–526 so that it is ready to be transmitted out immediately following the character already transmitted. The transfer pulse from FF-518 is also applied via inverter 534 and line 535 to reset FF-544, which has the effect of terminating the mark signal of the previous character and of starting the space signal of the next character.

The setting of output control FF-532 resets counters 536 and 538 to stop their operation until the transfer is completed, when FF-532 is again reset and starts the generation of UCP to shift out of the next character.

As indicated above, the fourth cell of the odd-numbered messages is sent into the modifier circuit 110 under control of ED-1. The fifth cell is similarly sent into the modifier 120 associated with U-2 by the enabling signal ED-2 (which is generated by gate 560 having the inputs C'-5, D'-1 and MSF). In a similar fashion, each of the remaining cells of the odd-numbered message is directed into the associated modifier 120 in succession, and finally, the 25th cell is sent into modifier 120 associated with U-22 under the control of enabling signal ED-22 (generated by gate 562 with inputs C'-5, D'-5, MSF). Thereafter, the fourth cell of the next even-numbered message is supplied to a similar utilization circuit 122 associated with U-23 under the control of enabling signal ED-23 (generated by gate 564 under the control of C'-4, D'-1, and MSF'). The remaining cells of the even-numbered message are sent in a similar fashion to their associated modifiers and utilization devices, and finally, the 25th cell is sent into modifier 122 associated with U-44 under the control of ED-44 (generated at that time by gale 566 having as inputs C'-5, D'-5, and MSF').

The transmission of the message cells into the modifiers 110, 120, 122 is at the rate of TCP which is 48 times as fast as the pulses UCP that are used to shift the information out to the utilization devices. Accordingly, the cycle of each modifier circuit is slightly less than the time required to process two messages and distribute the cells to the associated modifiers.

The *overall operation* of MP-1 is described with respect to FIGS. 4 and 5. The bit position counter 204 continuously counts the TCP pulses to develop upon each count of 6, a pulse on line 205 corresponding to a new cell. The cell signals on line 205 are successively counted in RC-1 and -2 which produce the A' and B' signals that, in combination, define the 25 cells of a message. In addition, when the B'-5 signal changes from a low level to a high level signal, the end of a message is indicated, and this is used to trigger message counter 212, whose outputs indicate whether the device is working on an odd-numbered or even-numbered message.

Assuming an odd-numbered message to start with, during the first cell, gate 219 is operated to produce a 0-bit during the first bit time of that cell followed by four 1-bits, all of which are passed by gate 218, and the parity generator 224, 214, and 216 inserts the sixth bit (a 1-bit). This first cell of sequential bits is generated on line 217 and sent out via a TCP controlled FF-224 to the adapter circuit 246 for the transmitter 24. Thereafter, during the second cell time, gate 221 is enabled to send out directly on line 217 a full cell of six 1-bits. During the third cell, gates 220, 222, and 223 are effective together with the parity generator to send out a special character cell of 010101 that defines the third cell of an odd-numbered message.

Prior to the fourth cell, a character from the S-1 source is supplied to the associated modifier 42 and is shifted into IR-312 by the slow SCP pulses and transferred to OR-346 (FIG. 5), except that the start and stop signals that form the first and seventh bits of that Teletype character are deleted. Thereafter, during the fourth cell of the message, gate 329 is enabled to generate the signal EB-1 which opens gate 344 to pass successive TCP pulses at the transmitting rate. Gate 344 is open for the entire cell so that six such pulses are produced, and the 5-bit character in OR-346 is shifted out via the then-open gate 350 to the output line 215. Gate 218 (FIG. 4) passes the first five bits of this character to the output line 217, and the parity generator 214 and gate 216 supply the sixth parity bit of the character.

Thereafter, during the fifth cell time, the character previously supplied by S-2 is similarly processed in its modifier circuit 44, and it is available for transmission out following immediately upon the fourth cell. This process continues until the 25th cell, in which the character supplied by S-22, is transmitted out in the same fashion.

Upon the completion of the 25th cell, message counter 212 is triggered to the opposite condition, and RC-1 and -2 recycle to start their cell counting from the beginning. The process of generating a first cell via gate 219 and a second cell via gate 221 is repeated so that the first two cells of special pattern are again repeated. The third cell this time is generated by way of the gates 229, 227, and 225. Thereafter, during the fourth cell of the even-numbered message, the character supplied by S-23 and processed in its modifier 45 is shifted out under the control of EB-23 by TCP and supplied to the output line 217. This process continues in the same fashion for each of the other sources S-24 to -44, and the character from the latter source processed in its modifier is shifted out under the control of EB-44 during the 25th cell time of the even-numbered message.

Thereafter, cell counters RC-1 and -2 are recycled to their initial condition, and message counter 112 is reversed back to the odd-numbered message condition, and the entire cycle described above is repeated. That is, the first three cells of this next odd-numbered message are generated by gates 219, 221, and 223, respectively. Thereafter, during the fourth cell, the next character from S-1 is supplied through the associated modifier circuit and shifted out of OR-246 and onto line 217, and so on, with all of the second characters from the sources being sent out in this and the following even-numbered message. This process continues in the same fashion through successive messages to send out successive ones of the characters from each of the sources.

Starting with an odd-numbered message, the first cell thereof is established in IBR-406, and when the 0-bit of that first cell is in the last stage of the register, divide-by-11 counter 410 is reset to start counting TCP pulses as the succeeding bits of the first two cells are shifted into IBR-406. Upon a count of 11, which recognizes the validity of the first two cells of the message, FF-416 is set. Also at that time, the third cell is then established in IBR, and its states are recognized by gates 428 and 432 which are effective to set FF-434, which in turn establishes the odd-numbered message signal MSF for a 5-bit period. At the same time, the cell counters 466, 468, the bit position counter 464, and the parity counter 454 are all reset.

The demultiplexer is then in condition to process the next 22 cells of the message, which comprise the data bits to be distributed to the utilization devices. By means of gate 450, each of the 1-bits coming in is detected and counted in parity counter 454. If an incorrect parity exists at the end of a cell, gate 456 is effective to recognize this and to insert an error code into the five information bits of the fourth cell. If correct parity is detected, the cell bits in IBR-406 are not affected. The signals coming out of the output stage 407 on line 409 are distributed in parallel to each of the modifier circuits 110, 120, 122. The particular modifier circuit that accepts a cell is determined by the count in cell counter 466, 468.

The bit position counter 464 and cell counter 466, 468 start to operate as the fourth cell (the first information cell of the message) is being shifted into IBR. CR-A is initially set to a count of 3, and upon the fourth cell being fully established in IBR, it is stepped to a count of 4. CR-B is initially set to a count of 1, and it is stepped each time CR-A overflows from a count of 5.

The enabling signal ED–1 for the first modifying circuit 110 is established at the same time that the fourth message cell is in IBR and ready to be shifted out on line 409. The first five bits of that fourth cell are established in IR–512. Thereafter, when the output cycle of circuit 110 is completed, gate 516 initiates the transfer of the five information bits into corresponding stages of OR–326. If the bits in IR–512 are all 0-bits, gate 516 recognizes this condition, and FF–514 is not set, and the transfer pulses accordingly not produced. This condition will occur periodically due to the fact that the rate of multiplexing transmission is slightly faster than the source input rate. Thereby, the output cycle is not initiated under these circumsttnces, and the blank character is not transmitted out.

The output cycle is started by the transfer pulse which is also used via inverter 534 to reset the output stage FF–544 to a space or 1-bit condition, reset FF–532, and to reset FF–514. The reset of FF–532, in turn, releases the reset of the divide-by-48 counter 536 and the divide-by-7 counter 538. The output stage 544 immediately supplies the space bit of the character to the utilization device U–1. Thereafter, successive UCP pulses at the rate required by U–1 shift out the five information bits of the character as well as the seventh or stop bit in the form of a mark signal (which was generated in the first stage of OR–526 by the first UCP). The length of this mark signal is increased by a suitable delay in the operation of gate 552 after the seven UCP are counted by counter 538. Thereafter, gate 552 sets output control FF–532 which resets counters 536 and 538 to terminate the output cycle. The output cycle can immediately restart if a character is ready in IR–512; this takes place upon the occurrence of the next TCP′ pulse generating the transfer pulse at FF–518, which pulse is also used to start the output cycle as described above.

After the fourth cell of an odd-numbered message is established in IR–512 of modifier circuit 110, the latter's output cycle is started at about the same time that the fifth cell of the message becomes established in IBR. At that time, enabling signal ED–2 is generated, and the modifier circuit 120 associated with U–2 is enabled to receive the five information bits of the fifth cell, and its output cycle is started. This operation continues successively with each successive cell being sent on to the associated utilization device via its modifier circuit until the 25th cell of the odd-numbered message is applied to the modifier 120 associated with U–22 and its output cycle is started.

Thereafter, the first cell of the next even-numbered message is established in IBR, and the counter 410 is reset to recognize the eleven-bit pattern of the first two cells. The third cell is established in IBR when counter 410 sets FF–416, and the third cell is recognized this time by gates 430 and 432 to enable gate 426 to pass a pulse that resets FF–434 and generates the MSF′ signal for the remainder of this message (except during the sixth bit of each cell). The pulse from gate 426 also again sets FF–436 which, in turn, resets the bit position counter 464 and the cell counter 466, 468, as described above. These counters were effective to count the 25th cell of the previous message as it was being shifted out of IBR (and as the first cell of the new message was following immediately behind). Thereafter, CR–B was stepped and lost its 1-bit which resulted in the stalling of counters 464, 466 and 468. These counters are reset and start their operation again upon recognition of the third cell in IBR.

When the fourth cell (the first data cell) of the even-numbered message is established in IBR, gate 564 establishes the enabling signal ED–23 for the modifier 122 of U–23. Thereby, this fourth cell is supplied to the modifier circuit and starts its output cycle to supply the reformed seven-bit character to U–23. This process continues for each of the remaining cells of the even-numbered message which are sent to the modifier circuits of the associated utilization device, and finally, the 25th cell is sent to modifier 122 for U–44 under the control of ED–44 which is established at that time. As the output cycle of this last modifier circuit 122 is started, the first cell of the next odd-numbered message is being received and shifted into IBR, and the process is repeated again.

Figure 8:
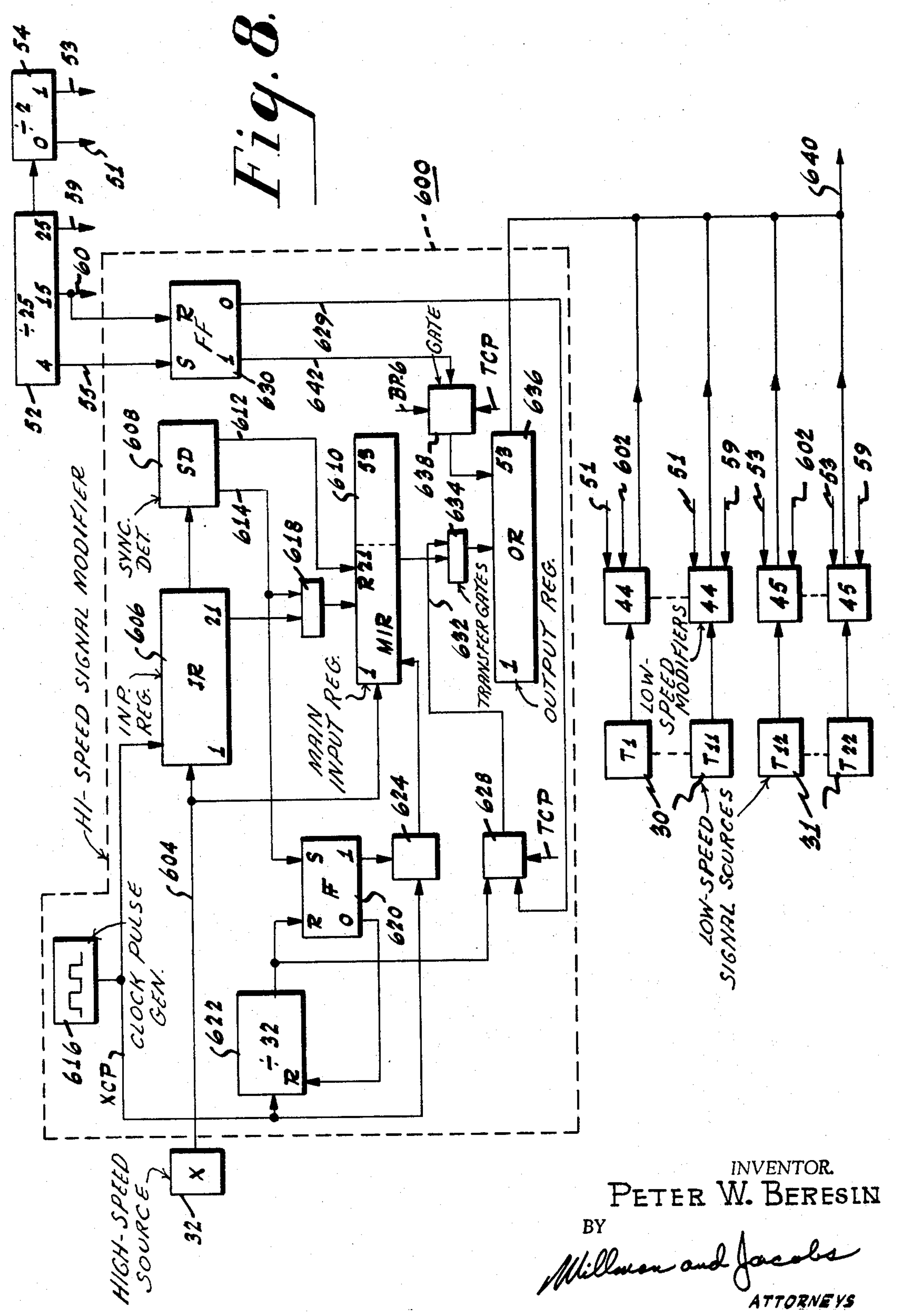
FIG. 8 is a schematic block diagram of a modified form of multiplexer used in the system of FIG. 1.

FIG. 8 is a block diagram of the modified multiplexer MP–2 which is effective to multiplex together sources of data of different characteristics. The cycle control of MP–2 is generally the same as that for MP–1, and cell counter 52 and message counter 54 are shown in FIG. 8. The sources T–1 to –22 may be considered to the Teletype lines, and modifier circuits 44 and 45 are provided of the type described above.

A modifier 600 is provided for the source X–32 which supplies its data at a higher bit rate (e.g. up to about 1 kc.) and in longer information units (e.g. a 64-bit word, with the first ten bits and the last bit used for its own synchronization pattern, and the remaining 53 bits used for data). The signals of a word from X–32 on line 604 are shifted into a 21-stage register IR–606 by clock pulses XCP from pulse generator 616, which are synchronized with the signals on line 604. The output signals from the last stage of IR–606 are applied to SD–608 which counts the initial ten bits of the word to detect the synchronization pattern. Upon detecting the synchronization pattern, SD–608 supplies a narrow pulse on line 612 which resets the main input register MIR–610, and a pulse on line 614 which is of a longer duration, and enables a plurality of gates 618 which are associated with the 21 stages of IR–606 to transfer their contents into the corresponding first 21 stages of MIR–610.

The pulse on line 614 also sets FF–620, which releases the reset on a divide-by-32 counter 622 so that it can count the XCP pulses. FF–620 also enables a gate 624 to pass XCP pulses to shift MIR–610. After 32 XCP pulses are passed to MIR–610, counter 622 resets FF–620 and closes gate 624. These 32 XCP pulses shift the rest of the word from X–32 (except the 64th bit of that word, which does not represent data) into MIR–610, which then contains all of the 53 data bits of that word. As FF–620 is reset, gate 628 is also enabled when FF–630 is reset to pass the next TCP clock pulse. This pulse on line 632 enables transfer gates 634 individually associated with the 53 stages of MIR–610 to transfer its contents in parallel to the output register OR–636. Shift pulses TCP are thereafter applied to OR–636 at the transmission pulse rate via gate 638 which is enabled when FF–630 is set. The BP–6 input to gate 638 prevents the shift out of the data bits from OR–636 during the sixth bit of each cell so that the parity bit may be inserted as described above. FF–630 is set during the fourth cell of transmission which is determined by the output on line 55 from the cell counter 52. FF–630 stays set until the beginning of the fifteenth cell when it is reset by the signal on line 602. The word in OR–636 is thus sent out during the fourth through fourteenth cells of the multiplex message. The last cell only includes the last three data bits of the word from OR–636, and the remaining two data bits are merely 0-bits that are discarded at the demultiplexer.

This operation is repeated as successive words are supplied by X–32, with IR–606 and MIR–610 accepting the next word immediately after the previous transfer to OR–636. IR–606 is an extra buffer register that is used where the bit rate of X–32 is very high. The modifier 600 is not restricted by message counter 54, and thus OR–636 is read out during both even and odd-numbered messages. The modifiers 44 for T–1 to –11 are operated by line 51 from message counter 54 during the odd-numbered messages, and modifiers 45 for T–12 to –22 are operated by line 53 during the even-numbered messages in a manner similar to that described above. Thus, the data of an odd-numbered message includes eleven cells for the word from X–32 followed by eleven cells for characters from T–1 to –11; and the data for the next even-numbered message includes eleven cells for the next word from X–32 followed by eleven cells for characters from T–12 to –22.

Figure 9:
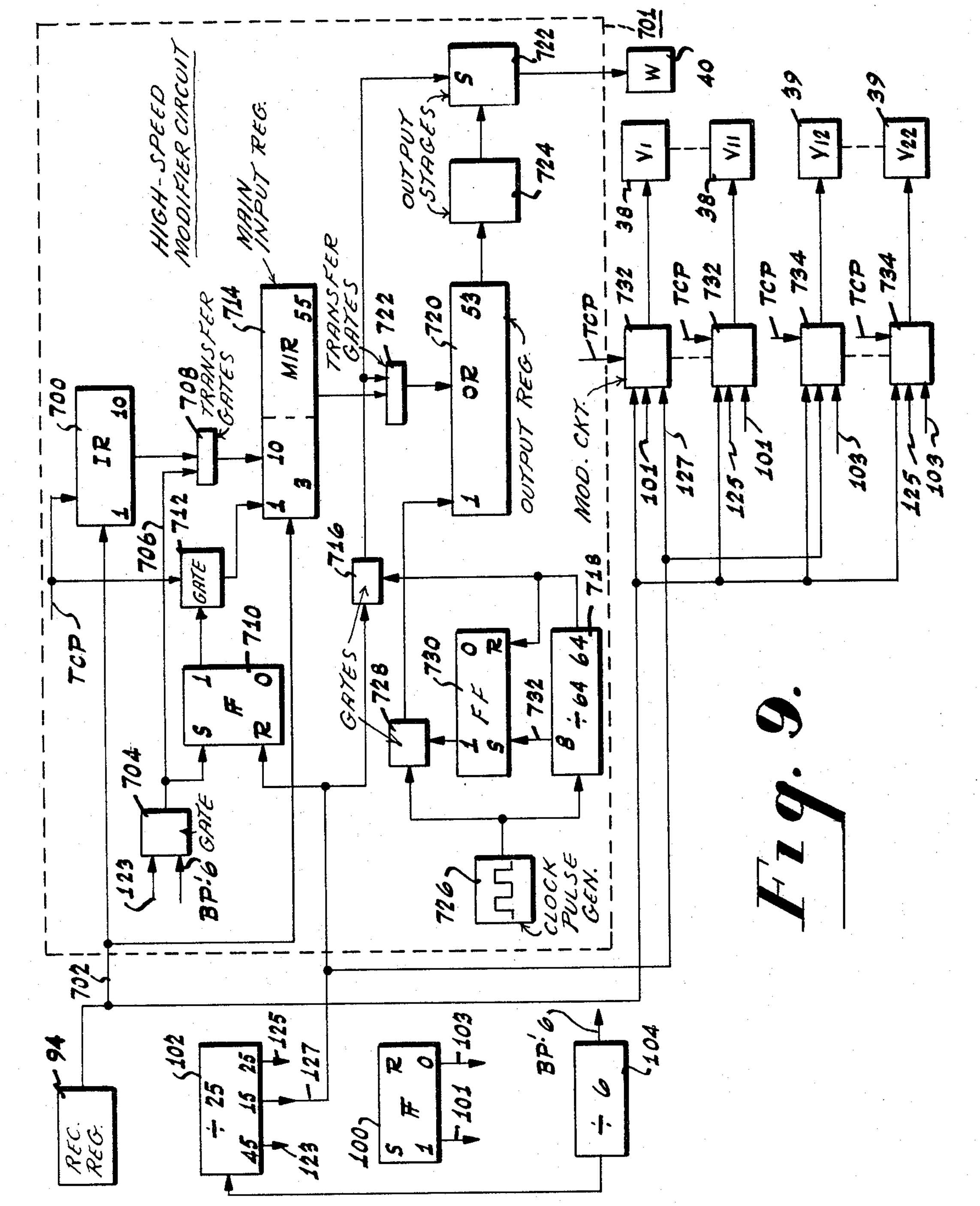
FIG. 9 is a schematic block diagram of a modified form of demultiplexer that is used with the multiplexer of FIG. 4 in the system of FIG. 1.

FIG. 9 shows details of the modification of the demultiplexer DM–2 for processing the messages transmitted by MP–2 of FIG. 8. The cycle control portion of DM–2 is generally the same as that of DM–1, and some of the corresponding parts are shown in FIG. 9; namely, register 94 that receives the incoming messages and assists in the pattern recognition process, cell counter 102, bit counter 104 and message FF–100.

The multiplex messages received in register 94 are applied to a ten-stage input register IR–700 via line 702 and shifted in by TCP clock pulses. Each data cell from register 94 contains five data bits. The fourth and fifth message cells are the first two such data cells and are shifted in succession into IR–700. At that time, that is, as the sixth bit of the fifth message cell (determined by a signal on the line 123 of counter 102 and the signal on the output line BP–6 from the bit counter 104), gate 704 is enabled to produce a signal on line 706, which in turn, enables transfer gates 708 that are individually associated with the ten data stages of IR–700. The signal on line 706 also sets FF–710 to enable gate 712, which passes TCP clock pulses to shift the main input register MIR–714. Gate 712 remains enabled for nine more cells, at which time the fifteenth cell signal on line 127 resets FF–710. Thereby, gate 712 is closed, and no further TCP pulses are passed to MIR–714.

The signal on line 127 also enables a gate 716 to pass a transfer pulse to gates 722 when the divide-by-64 counter 718 reaches the count of 64, which count indicates that OR–720 is then empty and ready for the next word. Gates 722 transfer the contents of stage–3 through –55 of MIR–714 into stage–1 through –53, respectively, of OR–720. No information is contained in stage–1 and –2 (extra 0-bits were inserted as the last two bits of the word in the multiplexer), and the failure to transfer these stages effectively discards the extra 0-bits.

As will be understood, registers 700, 714 and 720 contain data bits without the parity bits in the cells of the multiplex message. The parity bits may be discarded, as described for FIG. 7, by gating out TCP each sixth bit so that registers 700 and 714 will not be shifted.

Two output stages 722 and 724 are provided at the output of OR–720 to regenerate the synchronization pattern of nine 1-bits followed by a 0-bit at the beginning of the word and the 0-bit at the end of the word. The pulse from gate 716 also sets stage 722 so that a 1-bit is inserted in this stage; stage 724 is left reset and contains a 0-bit. The output signals of stage 722 are directly transmitted to the utilization device W–40 in a manner similar to that described above. Clock pulses from source 726 shift out the contents of OR–720 at the rate required by W–40, but these clock pulses are not fed to OR–720 until a gate 728 is enabled by the output of FF–730 when it is set. The shifting out of the contents of OR–720 is forestalled for eight clock pulses (counted by counter 718), at which pulse FF–730 is set by the signal on line 732. Over this eight-bit time period, the static output of stage 722 is read out as a stream of eight consecutive 1-bits. Upon FF–730 being set, gate 728 is enabled to pass the clock pulses to shift OR–720 and stages 722 and 724. During the next, or ninth clock pulse, a ninth 1-bit is the output signal to W–40, and the 0-bit in stage 724 is shifted to stage 722, which 0-bit is the output during the tenth pulse. Thereby, the synchronization bits of the original word from X–32 of nine 1-bits followed by a 0-bit are restored. On the next 53 clock pulses, the 53 bits of data are shifted out, and upon the 64th pulse, a final 0-bit is the output signal.

Thus, modifier circuit 701 receives the message at the transmission clock pulse rate, restores the synchronization signals which were stripped in the multiplexer modifier 600, and shifts out the contents to a utilization source W at the utilization source rate. In operation, during the fourth through fourteenth cells of the message, the full word is read into MIR–714. Upon the fifteenth cell of the message, the signal on line 127 resets FF–710, thereby disabling gate 712 and preventing further input to MIR–714. If an odd-numbered message is being processed, the signal on line 101 then enables the modifier circuits 732 for V–1 to –11 with the cell signals from counter 102 to successively distribute cells 15 through 25 of the odd-numbered message. The first eleven cells of an even-numbered message are processed by modifier 701 for W–40, and thereafter, the signal on line 103 and the cell signals on lines 127, 125 successively enable the modifier circuits 734 to receive the subsequent cells 15 through 25. Thus, the utilization source W receives the fourth through fourteenth cells of each message, and the utilization device V–1 to –11 and V–12 to –22 alternately receive the contents of the messages in cells 15 through 25 of odd and even messages, respectively.

The multiplexer system of FIGS. 8 and 9 transmits a word from source X–32 during each message to accommodate a relatively high speed bit rate in that source compared to the others. Other arrangements for multiplexing sources having different bit rates or different information unit sizes may be provided in accordance with the above description. For example, the sources 30 and 31 may also have different rates or character sizes which may be accommodated by utilizing more than one message per cycle of two messages as in the case of the modifier 600 for source X–32. Another alternative is that of utilizing more than one cell of each message for processing one or more information units, again as in the case of modifier 600.

A message cycle may consist of any number of messages; that is, in other embodiments, the third message cell is coded to identify many more additional messages, which are repeated in the same or a different order as is called for to provide efficient transmission. The different messages are also arranged to have different numbers of cells. Also, spaced cells in the same message may be used to process information units from a source having a very high repetition rate.

This invention is not restricted in its application to any particular number of sources or utilization devices; one may use larger or smaller numbers than in the illustrated embodiment. The number of information cells in a message may vary with the number of sources and with the choice of a single or a plurality of messages per cycle.

In the multiplexing system of this invention, the demultiplexer is operated under complete control of the multiplexer by means of the messages that are sent to it. The demultiplexer operates as a "slave" to carry out the "instructions" incorporated within the multiplexer's messages; that is, the multiplexer message inherently identifies the information units of the message and also identifies the particular group of utilization devices to which the information units are to be distributed. In the illustrated embodiments, a fixed format message is employed that identifies the beginning thereof and the group of utilization devices; it also effectively separates each information unit by the parity check bit.

The synchronizing pattern at the beginning of each message is made to be unique in order to maintain a high degree of reliability in the proper distribution of the information. However, though the unique pattern is advantageous, a pattern that is not completely unique may be provided for an acceptable lower level of reliability. However, it is preferred that the pattern be selected with a reasonable probability that it would not occur in the particular context in which it is inserted in the message. Moreover, where a plurality of messages are arranged in each cycle, different non-unique patterns of special codes may be utilized that merely identify the individual groups of utilization devices to which the information is to be distributed. It is preferable that the synchronizing patterns be inserted at the beginning of a message, though for other purposes, it may be inserted at various other locations thereof and identify information that preceded the synchronizing pattern in the transmission.

This multiplexing system is adapted to accept electrical signals having a high degree of distortion and to supply output signals that are essentially without "telegraph distortion." The system at its input utilizes clock pulses that individually detect each information element that is supplied. These clock pulses are timed to accept incoming signals having a very large amount of distortion. The signals are then reformed within the mutiplexer and clocked out to the transmitter so that they are free of distortion. Any distortion produced by the transmitting medium, whether it be a telegraph line, a voice cable, or radio, is again eliminated in the demultiplexer. The latter likewise clocks the incoming signals and reforms them to supply clocked output signals that are free of distortion.

Thus, in accordance with the invention, a highly efficient and reliable multiplexing system is provided. This system is effective in maintaining synchronization between multiplexer and demultiplexer and in avoiding the loss of information due to spurious signals. Moreover, signal sources that have different types of information units and different rates are readily accommodated.

Various suitable circuits that may be used in the above described embodiments are well known in the art. This invention is not restricted in its application to any particular circuit. One form of appropriate circuitry is described in the copending patent application, U.S. Ser. No. 149,913, filed Nov. 3, 1961, now Patent No. 3,281,788.

What is claimed is:

1. A multiplexing system for transmitting on a common medium information signals from a plurality of sources comprising a signal generator having a cyclic distributor, said generator comprising a first means responsive to said distributor for generating a first signal pattern on said medium during a first period of each cycle of said distributor, second means responsive to said distributor for generating a second signal pattern on said medium during a second period of each odd-numbered cycle of said distributor and third means responsive to said distributor for generating a third signal pattern on said medium during a second period of each even-numbered cycle of said distributor, said first pattern being different from any combination of signals from said sources; and means for supplying to said medium first messages that include said first and second signal patterns and information signals from a first plurality of said signal sources, and for supplying to said medium second messages that include said first and third signal patterns and information signals from a second plurality of signal sources.

2. The combination of claim 1 wherein said first plurality of signal sources and said second plurality of signal sources have common thereto a single signal source.

3. The combination of claim 2 wherein said common signal source has a higher message rate than the remainder of sources in each plurality.

4. A multiplex system for transmitting over a transmission channel information from a plurality of low-speed digital data sources and at least one high-speed digital data source which comprises a transmitter including a multiplexer for repeatedly transmitting multiplex messages each having a predetermined synchronizing bit pattern and a plurality of information cells each having a predetermined plurality of bit intervals, a cyclic distributor for allocating predetermined cells of said multiplex messages to respective low-speed sources and a predetermined plurality of cells to said high-speed source for transmitting data therefrom, a receiver for receiving said multiplex messages, a clock pulse generator for producing clock pulses at the bit rate of received messages and means utilizing received messages to synchronize said generator, a pattern recognition circuit for recognizing the synchronizing bit pattern in a multiplex message, counting means responsive to said recognition for counting said clock pulses in groups corresponding to the number of bit intervals in said cells and producing distribution signals for respective cells, means for utilizing the distribution signals corresponding to the cells allocated to said low-speed sources to supply the data therein to respective low-speed output message channels, and means for utilizing the distribution signals corresponding to the plurality of cells allocated to said high-speed source to supply the data therein to a high-speed output message channel.

5. A system according to claim 4 in which digital characters from said low-speed sources include data bits and synchronizing bits, comprising modifier circuits associated with respective low-speed sources for stripping from each character the synchronizing bits and supplying the stripped character data bits to the message cells allocated thereto, and a parity generator for inserting parity bits as required in the cells allocated to said low-speed sources.

6. A system in accordance with claim 5 in which parity bits are inserted as required to make the bit count in each cell allocated to a low-speed source opposite in oddness or evenness to the predetermined number of bit intervals in a cell, and said synchronizing bit pattern includes at least two cells with bits in each interval of one cell, whereby said synchronizing pattern is unique with respect to cells allocated to low-speed sources.

7. A system in accordance with claim 6 in which said parity bits are inserted as required in the cells allocated to the high-speed source.

8. A system in accordance with claim 4 including a plurality of groups of said low-speed sources, comprising means at the transmitter for cyclically changing a portion of said synchronizing bit pattern in successive messages corresponding to respective groups of low-speed sources, said cyclic distributor allocating predetermined cells of respective messages to the low-speed sources in respective groups and allocating a predetermined plurality of cells in each of said messages to said high-speed source, said receiver including a pattern recognition circuit recognizing the different synchronizing bit patterns in different messages, means responsive to the recognition of different synchronizing patterns for distributing the cells of respective messages allocated to data from low-speed sources to respective groups of low-speed output message channels, the data in the plurality of cells allocated to the high-speed source in each message being supplied to said high-speed output message channel.

9. A system in accordance with claim 8 in which the synchronizing bit pattern produced at the transmitter has a portion which is common to each message and another portion which is different in successive messages, the pattern recognition circuit at the receiver including a first section for recognizing said common portion and a second section for recognizing said different portions, and means responsive to the output of said second section for enabling different groups of low-speed output message channels to receive data from different messages, respectively.

References Cited

UNITED STATES PATENTS

| | | | |
|---|---|---|---|
| 2,946,044 | 7/1960 | Bolgiano et al. | 179—15 |
| 3,310,626 | 3/1967 | Cassidy | 178—50 |

ROBERT L. GRIFFIN, *Primary Examiner.*

JOHN W. CALDWELL, *Examiner.*

J. T. STRATMAN, *Assistant Examiner.*